(12) United States Patent
Byeon et al.

(10) Patent No.: US 9,063,370 B2
(45) Date of Patent: Jun. 23, 2015

(54) DISPLAY APPARATUS

(75) Inventors: Jonghyun Byeon, Seoul (KR); Hodong Hwang, Seoul (KR); Jongkyo An, Seoul (KR); Sangdon Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 289 days.

(21) Appl. No.: 13/605,421

(22) Filed: Sep. 6, 2012

(65) Prior Publication Data

US 2013/0071598 A1 Mar. 21, 2013

(30) Foreign Application Priority Data

Sep. 19, 2011 (KR) .................. 10-2011-0093784

(51) Int. Cl.
| | |
|---|---|
| *B32B 3/02* | (2006.01) |
| *B32B 3/06* | (2006.01) |
| *B32B 3/04* | (2006.01) |
| *G02F 1/1335* | (2006.01) |
| *G02F 1/1333* | (2006.01) |

(52) U.S. Cl.
CPC ............ *G02F 1/1336* (2013.01); *Y10T 428/239* (2015.01); *Y10T 428/19* (2015.01); *Y10T 428/23* (2015.01); *Y10T 428/24802* (2015.01); *G02F 2001/133314* (2013.01); *G02F 2202/28* (2013.01); *G02F 2001/133311* (2013.01)

(58) Field of Classification Search
CPC ................... G02F 2001/133314; G02F 1/1336
USPC ..................................... 428/57; 345/156, 173
See application file for complete search history.

(56) References Cited

U.S. PATENT DOCUMENTS

| | | |
|---|---|---|
| 6,538,709 B1 | 3/2003 | Kurihara et al. |
| 2009/0219259 A1* | 9/2009 | Kwon .................. 345/173 |
| 2010/0128198 A1 | 5/2010 | Kim et al. ............ 349/61 |
| 2010/0327737 A1 | 12/2010 | Hayashi et al. |
| 2011/0026240 A1 | 2/2011 | Hayashi et al. |
| 2011/0058121 A1 | 3/2011 | Yabe |
| 2011/0080695 A1 | 4/2011 | Cho et al. |
| 2011/0205454 A1 | 8/2011 | Kim et al. |

FOREIGN PATENT DOCUMENTS

| | | |
|---|---|---|
| CN | 101603668 A | 12/2009 |
| CN | 101688997 A | 3/2010 |
| CN | 101713885 A | 5/2010 |
| CN | 101960366 A | 1/2011 |
| JP | 6-82764 A | 3/1994 |
| JP | 2005-49450 A | 2/2005 |
| JP | 2011-164185 A | 8/2011 |
| KR | 10-2004-0103695 A | 12/2004 |

OTHER PUBLICATIONS

Chinese Office Action dated May 28, 2014 issued in Application No. 201210347358.2 (with English Translation).
European Search Report issued in related Application No. 12006525.5 dated Nov. 5, 2014.
European Search Report issued in Application No. 12006525.5 dated Feb. 24, 2015.

* cited by examiner

*Primary Examiner* — Brent O'Hern
(74) *Attorney, Agent, or Firm* — Ked & Associates, LLP

(57) ABSTRACT

A display apparatus includes a display apparatus comprising, a display panel comprising a front substrate and a back substrate, at least one structure disposed in the rear of the display panel, and a supporting film attached to the display panel and connected to at least one structure.

18 Claims, 46 Drawing Sheets

DISPLAY APPARATUS

This application claims the benefit of Korean Patent Application No. 10-2011-0093784 filed on Sep. 19, 2011, the entire contents of which is incorporated herein by reference for all purposes as if fully set forth herein.

BACKGROUND OF THE INVENTION

1. Field of the Invention

Embodiments of the invention relate to a display apparatus.

2. Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices. Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

FIG. 1 illustrates a related art display device.

As shown in FIG. 1, a related art display device includes a display panel 100P including a front substrate and a back substrate, an optical layer 120P disposed in the rear of the display panel 100P, a frame 130P disposed in the rear of the optical layer 120P, first and second fastening parts 160P and 170P for fastening the display panel 100P, the optical layer 120P, and the frame 130P, a protective substrate 110P disposed in the front of the display panel 100P, a third fastening part 150P for fastening the protective substrate 110P, and a back cover 140P which is connected to the third fastening part 150P and is disposed in the rear of the frame 130P.

The related art display device has the complicated structure disclosed herein, and also it is difficult to achieve a thin profile of the related art display device. Further, visibility of the related art display device is reduced.

SUMMARY OF THE INVENTION

In one aspect, there is a display apparatus including a display apparatus comprising, a display panel comprising a front substrate and a back substrate, at least one structure disposed in the rear of the display panel, and a supporting film attached to the display panel and connected to at least one structure.

The supporting film comprises a light transmissive material.

The supporting film surrounds at least one structure.

The display apparatus further comprises a film joining portion connected to both ends of the supporting film.

The structure comprises, at least one of a bracket, an optical sheet disposed on the bracket, and a frame connected to the bracket.

The film joining portion is connected to the frame.

The supporting film comprises, a first supporting film corresponding to a display area for displaying an image of the display panel and a second supporting film corresponding to a dummy area positioned outside the display area of the display panel.

The transmittance of the first supporting film is higher than the transmittance of the second supporting film, and the tensile strength of the second supporting film is higher than the tensile strength of the first supporting film.

The first supporting film and the second supporting film comprise a mutually overlapping portion.

The display apparatus further comprises a first film joining portion connected to one end of the supporting film and a second film joining portion connected to the other end of the supporting film.

The display apparatus further comprises a horizontal film joining portion connected to both ends of the supporting film in a horizontal direction and a vertical film joining portion connected to both ends of the supporting film in a vertical direction.

The display apparatus at least one structure is attached to the supporting film.

The supporting film comprises a portion attached to the rear surface of the back substrate.

The supporting film comprises a portion attached to the front surface of the front substrate.

The supporting film further comprises a portion attached to sides of the front substrate and back substrate.

The structure further comprises at least one bracket disposed on the supporting film and fastening means for fastening the bracket and the supporting film.

The display apparatus further comprises an optical sheet disposed on the bracket, a frame connected to the bracket, and fastening means for fastening the frame and the supporting film.

The display apparatus further comprises a side cover comprising a portion that covers the side of the display panel and a back cover positioned in the rear of the display panel and connected to the side cover.

The display apparatus further comprises a bottom cover for covering a portion of a bottom area of the front surface of the display panel.

An edge of the front surface of the display panel is exposed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
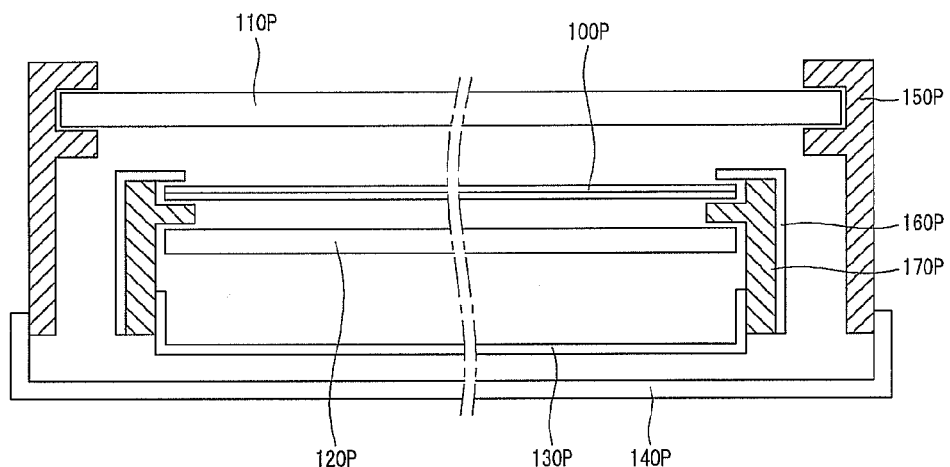
FIG. 1 illustrates a related art display device.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or" being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, a liquid crystal display panel is used as an example of a display panel. Other display panels may be used. For example, a plasma display panel (PDP), a field emission display (FED) panel, and an organic light emitting diode (OLED) display panel may be used.

FIGS. 2 to 5 illustrate a configuration of a display apparatus according to an example embodiment of the invention.

Figure 2:
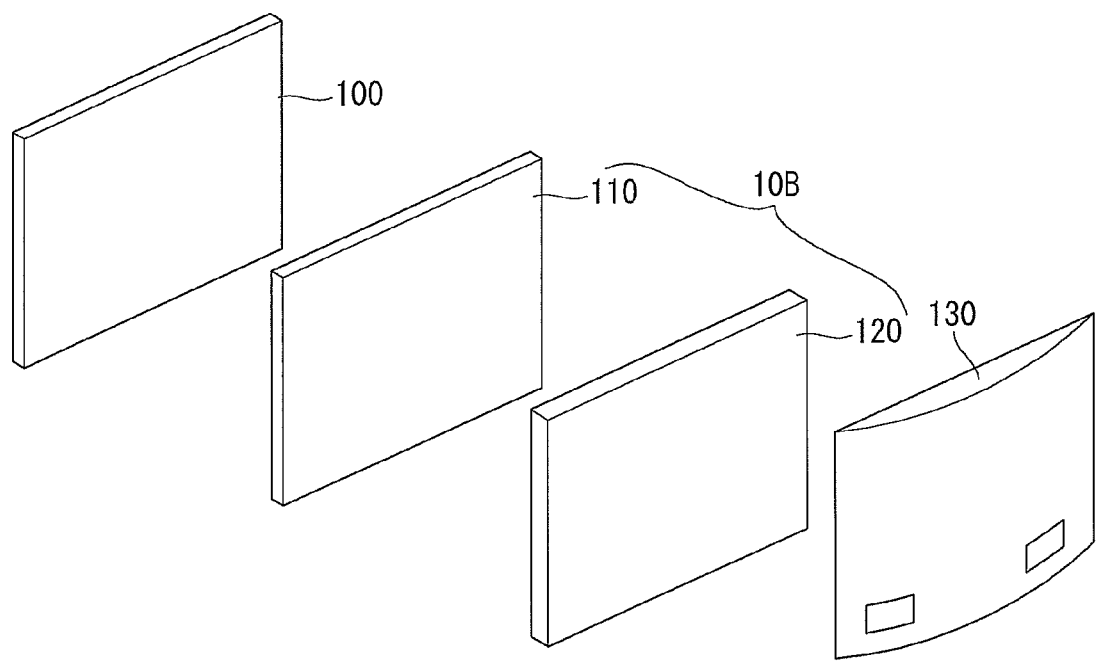
FIGS. 2 to 5 illustrate a configuration of a display apparatus according to an example embodiment of the invention.

As shown in FIG. 2, a display apparatus according to an example embodiment of the invention may include a display panel 100, a backlight unit 10B including an optical layer 110, a light source 120, and a back cover 130. And, the display apparatus further include a supporting film SFM (not shown). Detail descriptions of the supporting film may disclosed in the below.

The display panel 100 displaying an image may include a front substrate and a back substrate that are positioned opposite each other.

The optical layer 110 may be disposed between the back substrate and the back cover 130.

The optical layer 110 may include a plurality of sheets. For example, although not shown, the optical layer 110 may include at least one of a prism sheet and a diffusion sheet.

The backlight unit 10B may be disposed in the rear of the optical layer 110. Although not shown, the backlight unit 10B may further include a frame as well as the light source 120. In the embodiment disclosed herein, the backlight unit 10B includes the light source 120, the optical layer 110, and the frame (not shown). However, the backlight unit 10B may include a light guide plate (not shown). Further, in the embodiment disclosed herein, the backlight unit 10B may be used as the light source 120 and thus may indicate the light source 120. In other word, the backlight unit 10B may be referred to as the light source.

The configuration of the backlight unit may be variously changed.

Various types of light sources 120 may be used in the embodiment of the invention. For example, the light source may be one of a light emitting diode (LED) chip and a LED package having at least one LED chip. In this instance, the light source may be a colored LED emitting at least one of red, green, and blue light or a white LED.

Although the embodiment of the invention describes the direct type backlight unit 10B as an example, an edge type backlight unit may be used.

The back cover 130 may be positioned in the rear of the backlight unit 10B. The back cover 130 may protect the backlight unit 10B and the optical layer 110 from an impact or a pressure applied from the outside.

The optical layer 110 may be closely attached to the display panel 100. Alternatively, the optical layer 110 may be separated from the display panel 100 by a predetermined distance.

Alternatively, the backlight unit 10B may be closely attached to the optical layer 110. In this instance, a thickness of the display apparatus according to the embodiment of the invention may be reduced.

Figure 3:
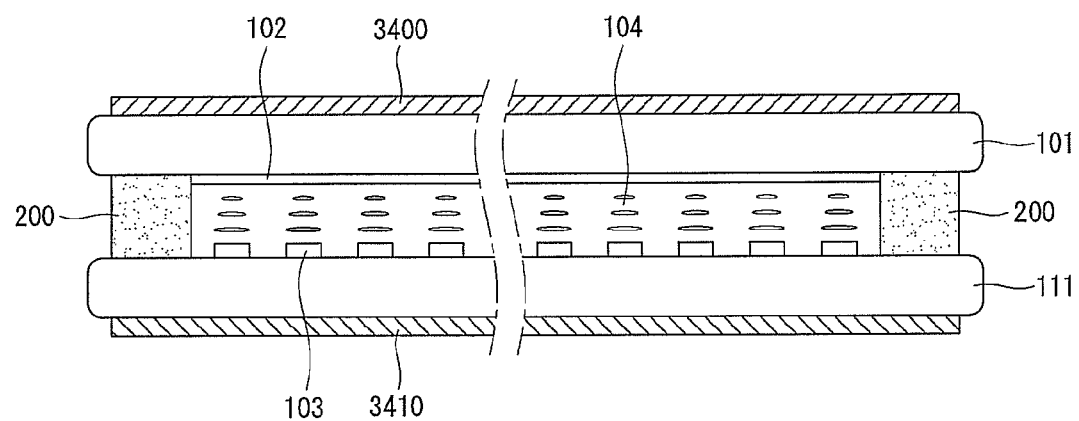

As shown in FIG. 3, the display panel 100 may include a front substrate 101 and a back substrate 111, that are positioned opposite each other and attached to each other to form a uniform cell gap therebetween. A liquid crystal layer 104 may be formed between the front substrate 101 and the back substrate 111.

A seal part 200 may be formed between the front substrate 101 and the back substrate 111 to seal the liquid crystal layer 104.

A color filter 102 may be positioned on the front substrate 101 to implement red, green, and blue colors. The color filter 102 may include a plurality of pixels each including red, green, and blue subpixels. Other configurations of the subpixels may be used for the pixel. For example, each pixel may include red, green, blue, and white subpixels. When light is incident on the color filter 102, the color filter 102 may generate images corresponding to the red, green, and blue colors.

A predetermined transistor 103, for example, a thin film transistor (TFT) may be formed on the back substrate 111. The transistor 103 may turn on or off liquid crystals in each pixel. In this instance, the front substrate 101 may be referred to as a color filter substrate, and the back substrate 111 may be referred to as a TFT substrate.

The display panel 100 may further include a front polarizing film 3400 and a back polarizing film 3410. The front polarizing film 3400 may be positioned on a front surface of the front substrate 101 to polarize light passing through the display panel 100. The back polarizing film 3410 may be positioned on a back surface of the back substrate 111 to polarize light passing through the optical layer 110 positioned in the rear of the back substrate 111. In the embodiment disclosed herein, the front polarizing film 3400 may be referred to as a first front polarizing film, and the back polarizing film 3410 may be referred to as a second front polarizing film.

The liquid crystal layer 104 may include a plurality of liquid crystal molecules, and the arrangement of the liquid crystal molecules may change in response to a driving signal supplied by the transistor 103. Hence, light provided by the backlight unit 10B may be incident on the color filter 102 based on changes in the molecular arrangement of the liquid crystal layer 104. As a result, the color filter 102 may implement red, green, and blue light, and thus a predetermined image may be displayed on the front substrate 101 of the display panel 100.

Figure 4:
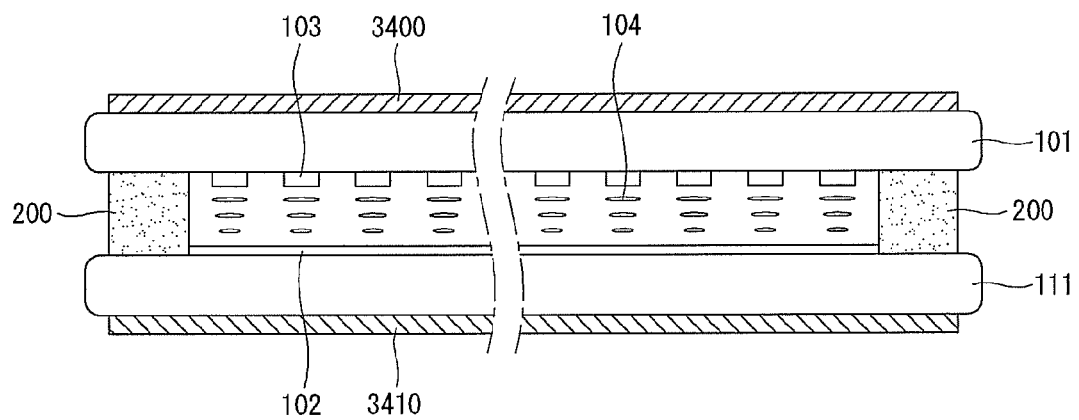

Alternatively, as shown in FIG. 4, a color filter 102 for implementing red, green, and blue colors may be positioned on the back substrate 111.

Further, a predetermined transistor 103, for example, a TFT may be formed on the front substrate 101. The transistor 103 may turn on or off liquid crystals in each pixel. In this instance, the back substrate 111 may be referred to as a color filter substrate, and the front substrate 101 may be referred to as a TFT substrate.

As above, when the transistor 103 is formed on the front substrate 101, it is easy to install a connecting unit, such as a cable and a flexible printed circuit board, for connecting a driving board (not shown) to the transistor 103 on the front substrate 101.

Further, the driving board may be disposed in the rear of the display panel 100. In this instance, a length of the connecting unit for connecting the driving board to the transistor 103 may be reduced.

Figure 5:
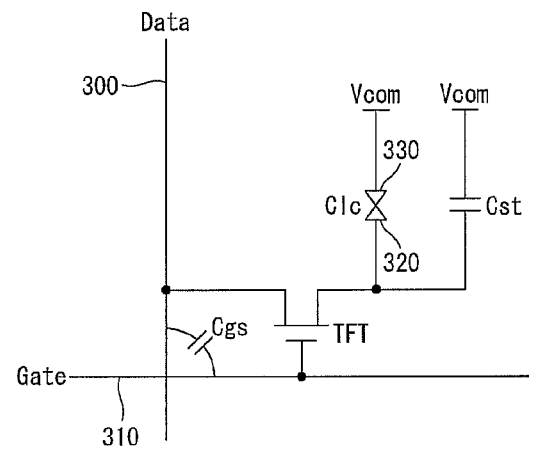

As shown in FIG. 5, each pixel of the display panel 100 may include a data line 300, a gate line 310 crossing the data line 300, and the TFT 103 connected to a crossing of the data line 300 and the gate line 310.

The TFT 103 supplies a data voltage supplied through the data line 300 to a pixel electrode 320 of a liquid crystal cell Clc in response to a gate pulse from the gate line 310. The liquid crystal cell Clc is driven by an electric field generated by a voltage difference between a voltage of the pixel electrode 320 and a common voltage Vcom applied to a common electrode 330, thereby controlling an amount of light passing through a polarizing plate. A storage capacitor Cst is connected to the pixel electrode 320 of the liquid crystal cell Clc and holds the voltage of the liquid crystal cell Clc.

Since the above-described structure and the above-described configuration of the display panel 100 are only one example, they may be changed, added, or omitted.

Figure 6:
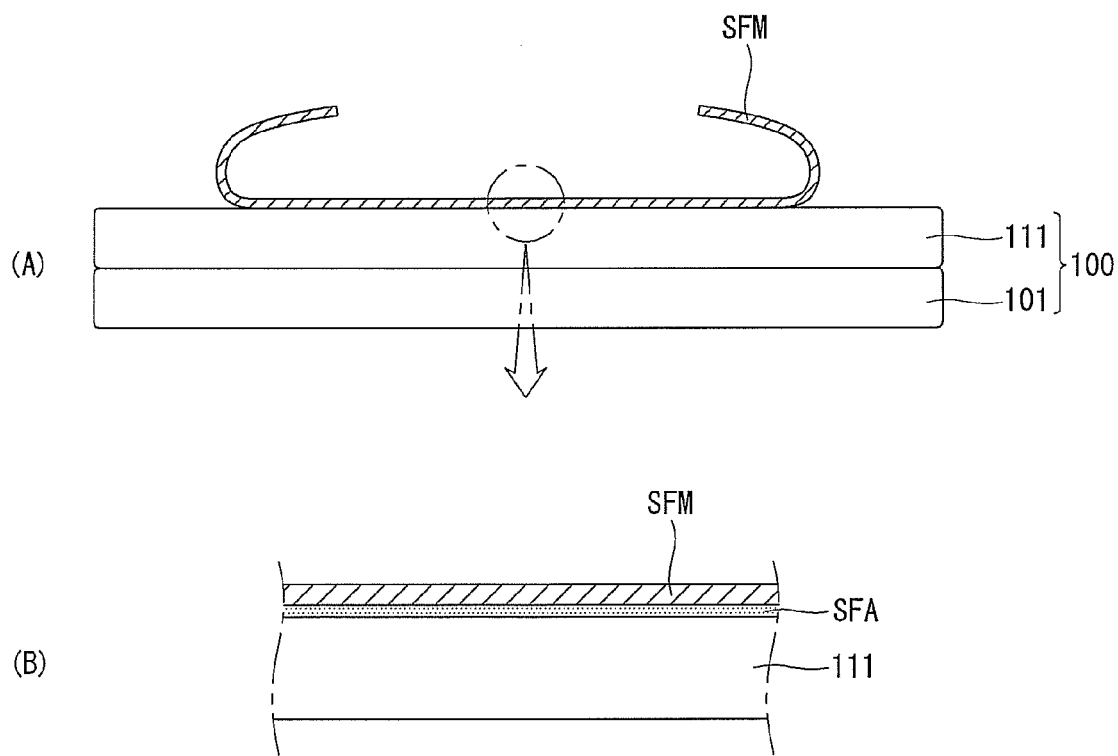
FIGS. 6 to 67 illustrate a structure of a display apparatus according to an example embodiment of the invention.
Figure 67:
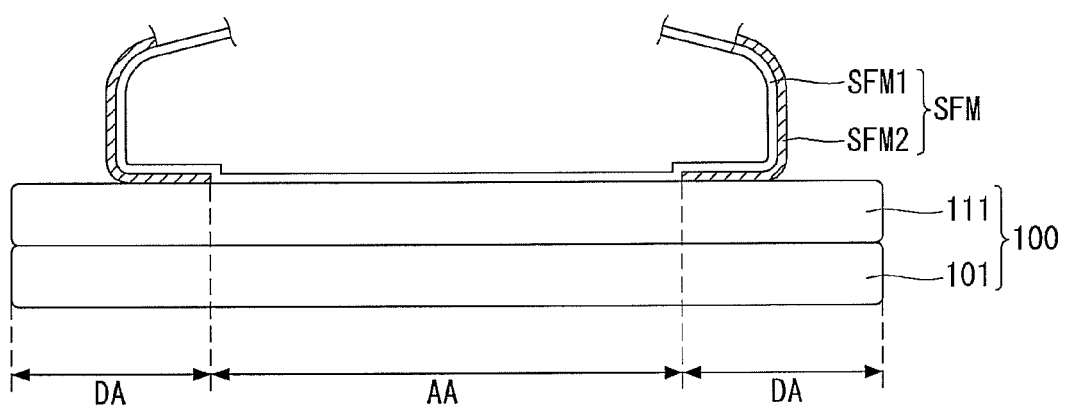

FIGS. 6 to 67 illustrate a structure of a display apparatus according to an example embodiment of the invention. In the following description, the descriptions of the configuration and the structure described above are omitted.

Referring to (A) of FIG. 6, a supporting film SFM may be disposed in the rear of the display panel 100, more specifically, the rear of the back substrate 11. The supporting film SFM may include a portion attached to a rear surface of the back substrate 111. More specifically, as shown in (B) of FIG. 6, an adhesive layer SFA may be disposed between the supporting film SFM and the back substrate 111 to attach the supporting film SFM to the back substrate 111.

Such a supporting film SFM may be connected to at least one predetermined structure, and therefore restrain and support the at least one structure. Also, one end and the other end of the supporting film SFM may be connected to each other.

Figure 7:
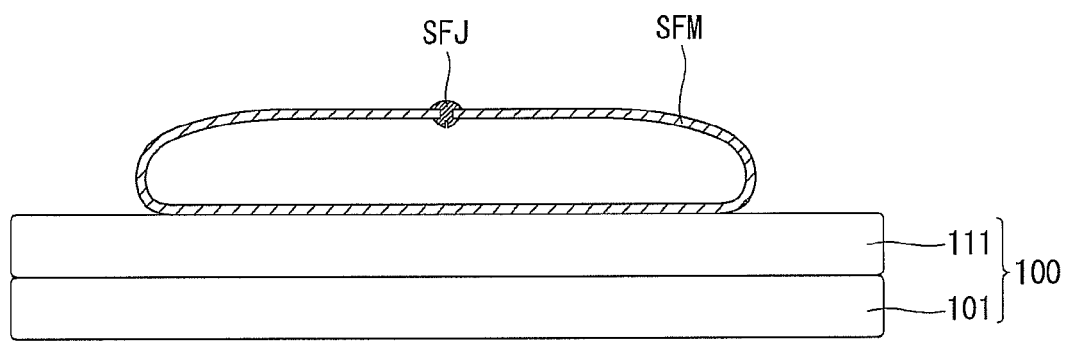

For example, as shown in FIG. 7, a film joining portion SFJ may be connected to both ends of the supporting film SFM to fix the both ends of the supporting film SFM. As the both ends of the supporting film SFM are connected to the film joining portion SFJ, enough space for predetermined structures to be disposed inside the supporting film SFM may be provided.

Figure 8:
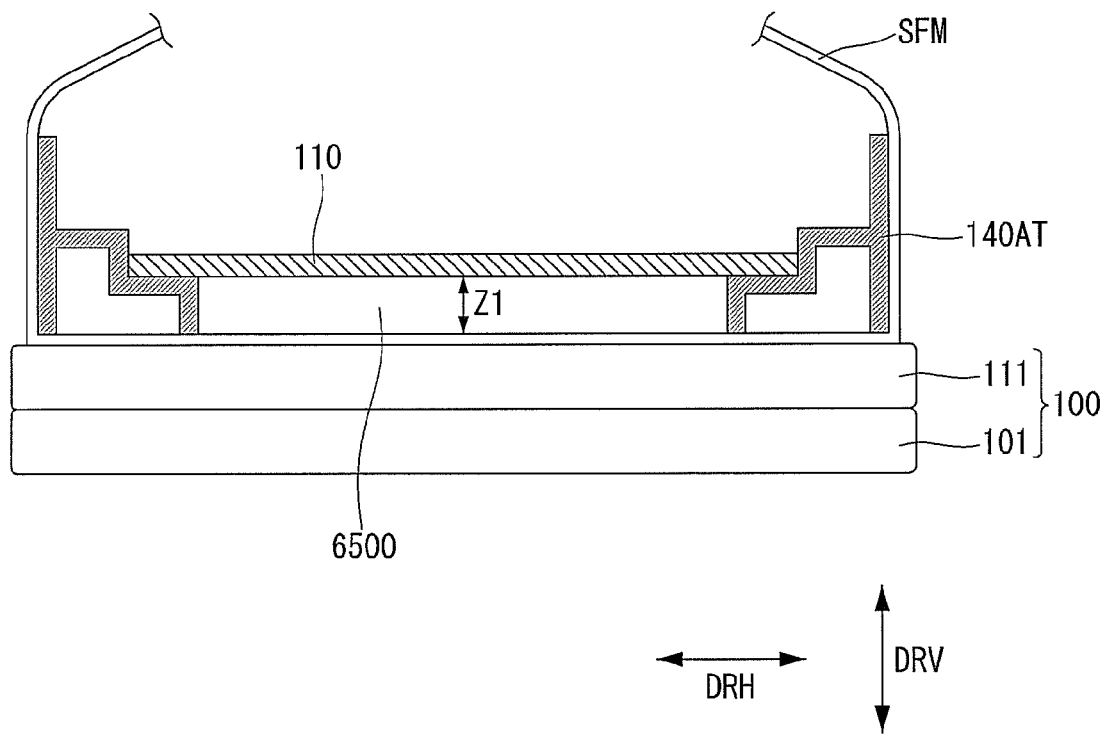

Referring to FIG. 8, the predetermined structures provided inside the supporting film SFM may be disposed. In this case, at least one of these structures may be surrounded by the supporting film SFM. For example, a bracket 140AT may be disposed in an internal space provided by the supporting film SFM.

Also, an optical layer 110 (optical sheet) may be disposed on the bracket 140AT.

As above, when the optical layer 110 is disposed on the bracket 140AT, the optical layer 110 may be separated from the back substrate 111 by a predetermined distance Z1. Hence, an air gap 6500 may be formed between the back substrate 111 and the optical layer 110.

As above, when the air gap 6500 is formed between the back substrate 111 and the optical layer 110, the optical characteristics of the display apparatus may be improved by the air gap 6500.

Figure 9:
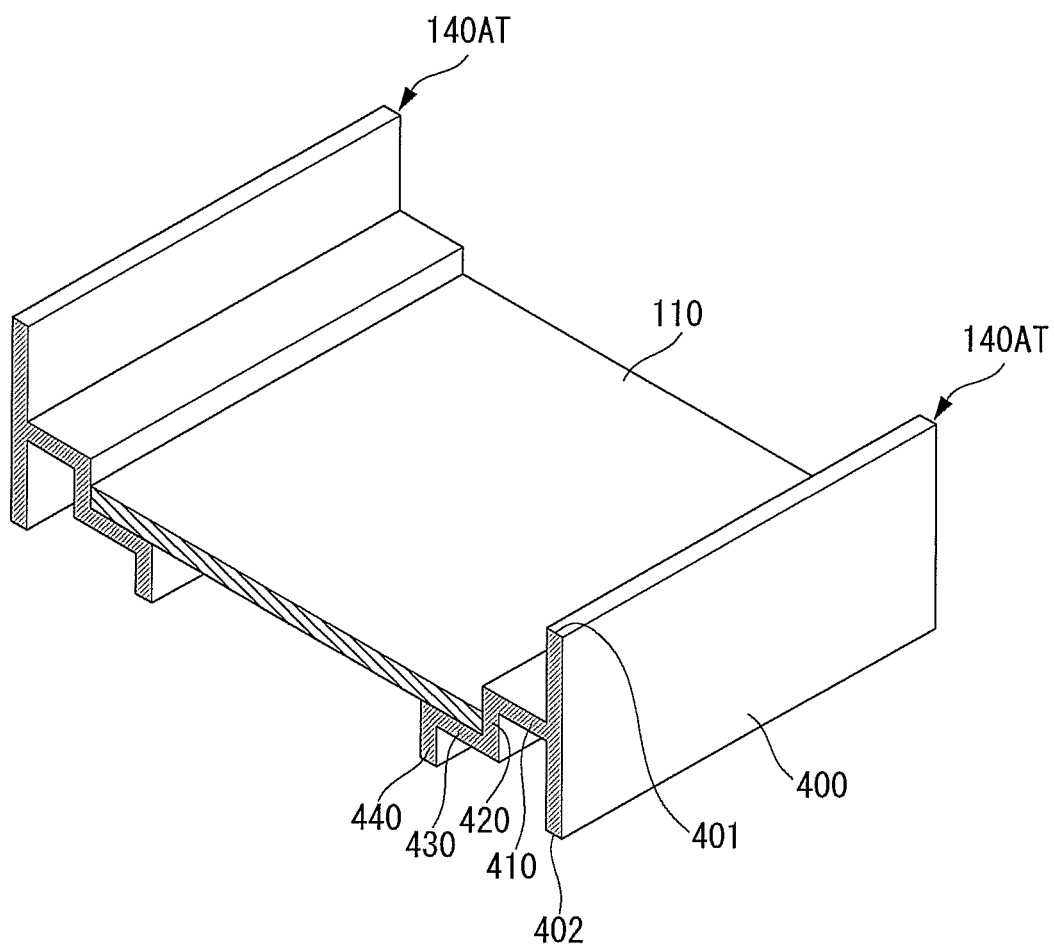

As shown in FIG. 9, the bracket 140 AT may include a first portion 410 extending from a sidewall 400 in a first direction DRH (horizontal direction), a second portion 420 extending from the first portion 410 in a second direction DRV (vertical direction), a third portion 430 extending from the second portion 420 in the first direction DRH, and a fourth portion 440 extending from the third portion 430 in the second direction DRV.

Preferably, the second portion 420 extends from an end of the first portion 410, the third portion 430 extends from an end of the second portion 420, and the fourth portion 440 extends from an end of the third portion 430. Also, the first portion 410 may be positioned between a first end 401 and second end 402 of the sidewall 400 in the second direction DRV. Also, the sidewall 400 may extend in a third direction DRV, which is different from the first and second directions DRH and DRV. The first, second, and third directions DRH, DRV, and DRZ may be orthogonal to one another.

The optical layer 110 may be disposed on the third portion 430 of the bracket 140AT.

In the embodiment of the invention, the structure and the shape of the bracket 140AT may be variously changed.

Figure 10:
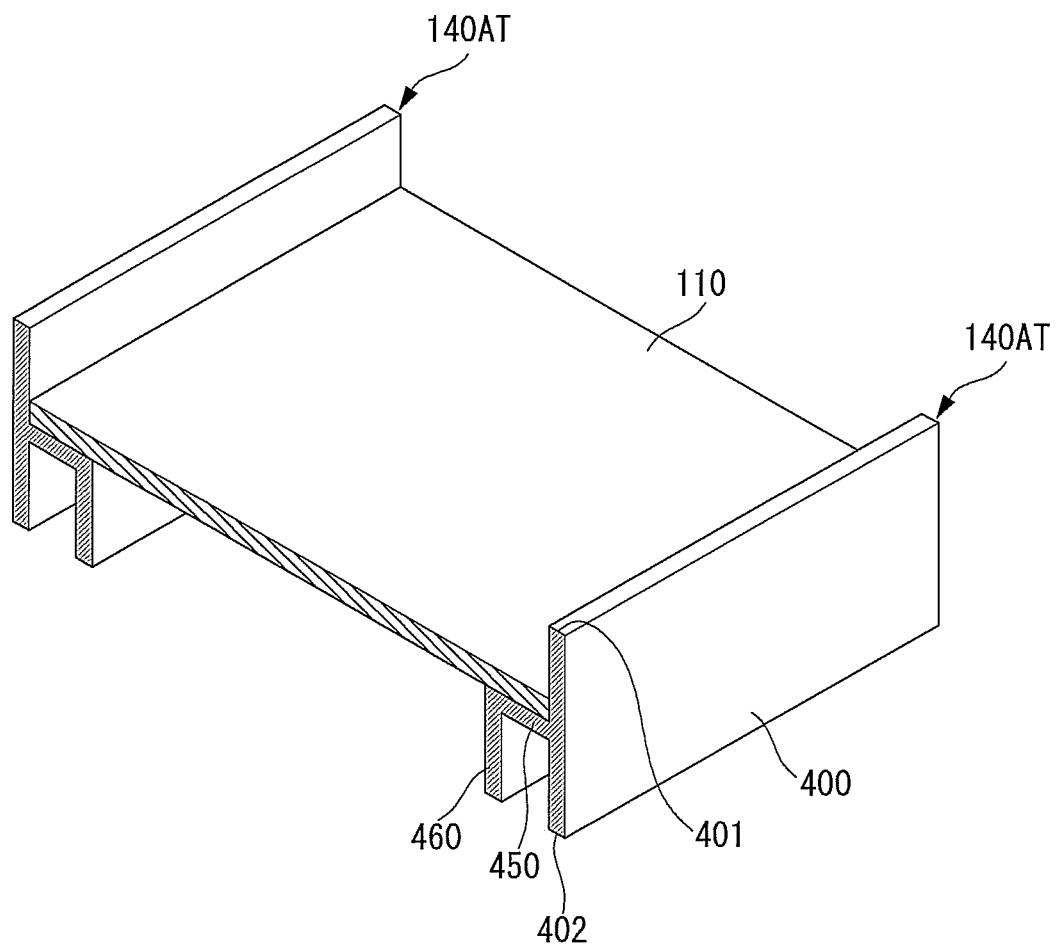
Figure 10:
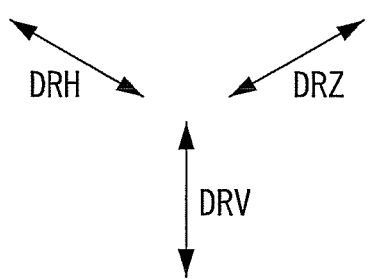

For example, as shown in FIG. 10, the bracket 140AT may include a sidewall 400, a first extension 450 extending from the sidewall 400 in the first direction DRH and a second extension 460 extending from the first extension 450 in the second direction DRV.

Preferably, the second extension 460 extends from an end of the first extension 450.

In this case, the optical layer may be disposed on the first extension 450 of the bracket 140AT.

Alternatively, as shown in FIG. 1, the bracket 140AT may include a sidewall 400, a first wall 470 extending from the side wall 400 in a first direction DRH, a second wall 471 extending from the first wall 470 in a second direction DRV, a third wall 472 extending from the second wall 471 in the first direction DRH, a fourth wall 473 extending from the third wall 472 in the second direction DRV, and a fifth wall 474 extending from the fourth wall 473 in the first direction DRH and connected to the sidewall 400.

Figure 11:
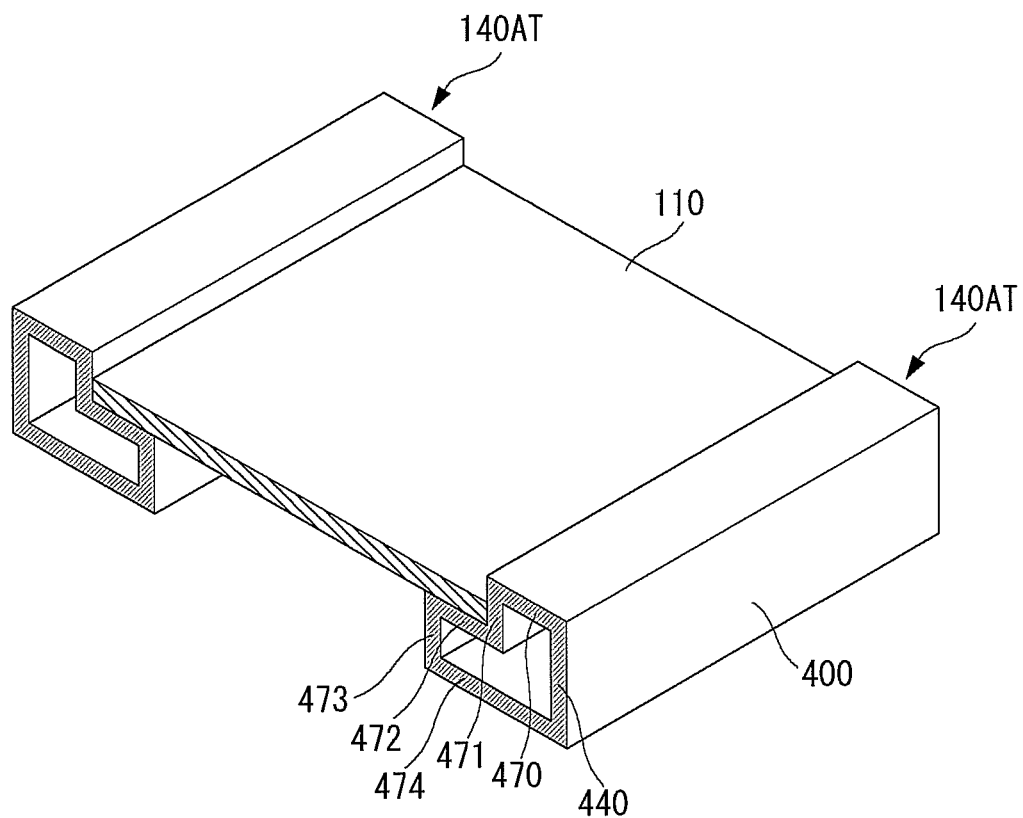

In the present invention, the shape of the bracket 140AT may not be limited to those shown in FIGS. 9 to 11.

Meanwhile, the display panel 100 (or front/back substrates 101 and 111) may include a first long side LS1, a second long side LS2 facing the first long side LS1, a first short side SS1 adjacent to the first and second long sides LS1 and LS2, and a second short side SS2 facing the first short side SS1.

Figure 12:
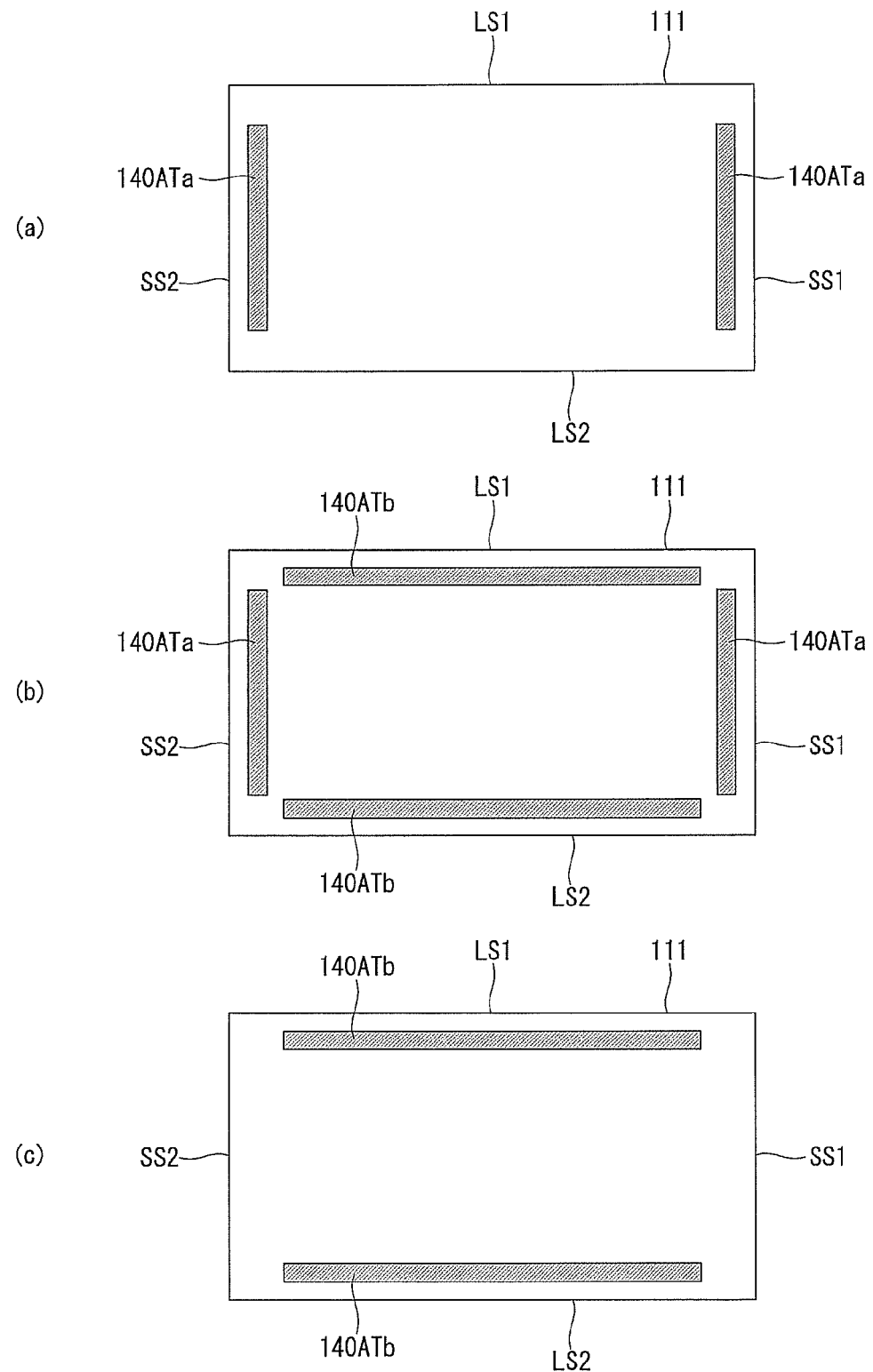

Here, as shown in FIG. 12(A), a bracket 140ATa may be disposed on the first short side SS1 and second short side SS2 of the back substrate 111. The bracket disposed on the short sides of the back substrate 11 may be referred to as a vertical bracket 140ATa.

Alternatively, as shown in FIG. 12(B), a bracket ATb may be disposed on the first long side LS1 and second long side LS2, as well as on the first short side SS1 and second short side SS2 of the back substrate 111. The bracket disposed on the long sides of the back substrate 111 may be referred to as a horizontal bracket 140ATb.

Alternatively, as shown in FIG. 12(C), a bracket 140ATb may be disposed on the first long side LS1 and second long side LS1 of the back substrate 111.

As stated above, the position at which the bracket AT is disposed may be varied in many different ways.

Figure 13:
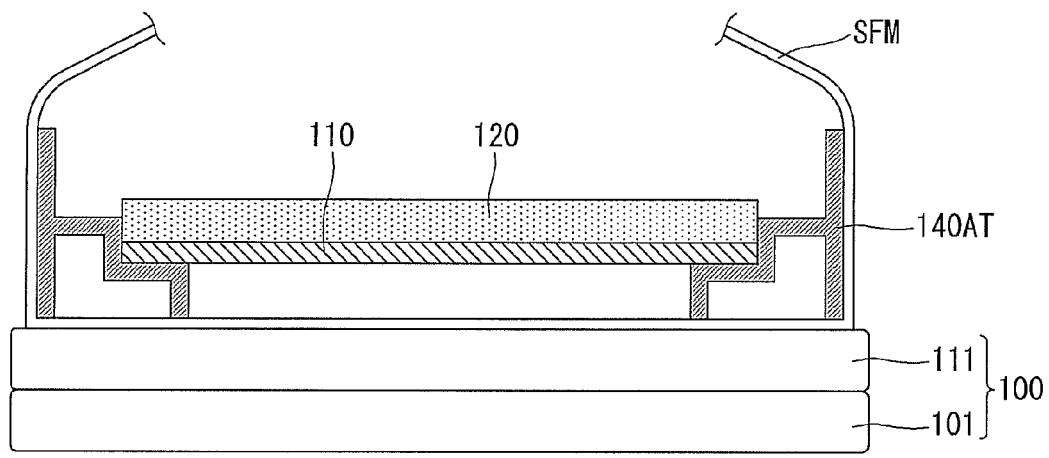

As shown in FIG. 13, the light source 120 may be disposed on the optical layer 110. In this instance, the light source 120 may be the direct type backlight unit.

Figure 14:
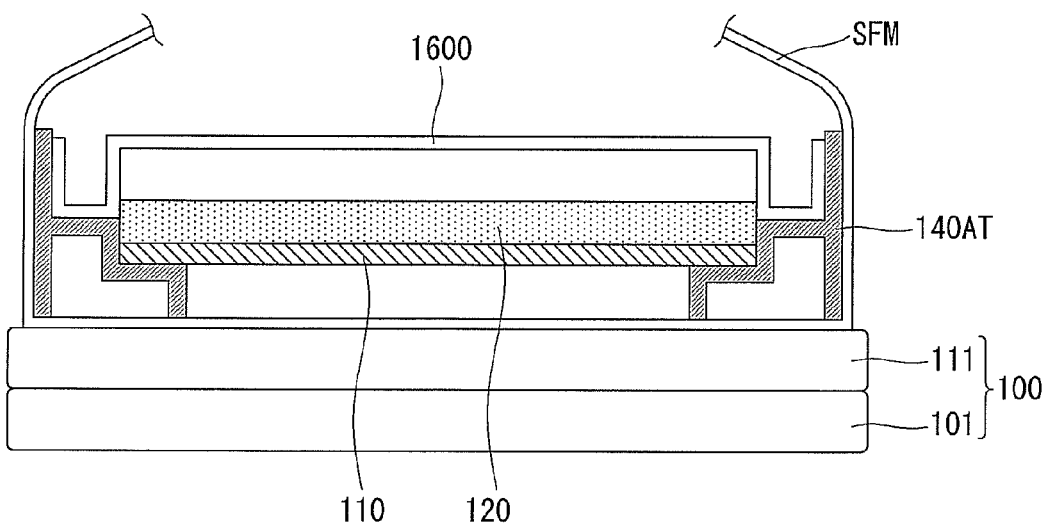

Referring to FIG. 14, a frame 1600 may be disposed in the rear of the light source 120. This frame 1600 may be connected to the bracket 140AT. Also, though not shown, the frame 1600 may be connected to the back cover 130.

Moreover, although FIG. 14 illustrates the light source 120 and the frame 1600 as being separated from each other, the light source 120 may be closely attached to the frame 1600.

Figure 15:
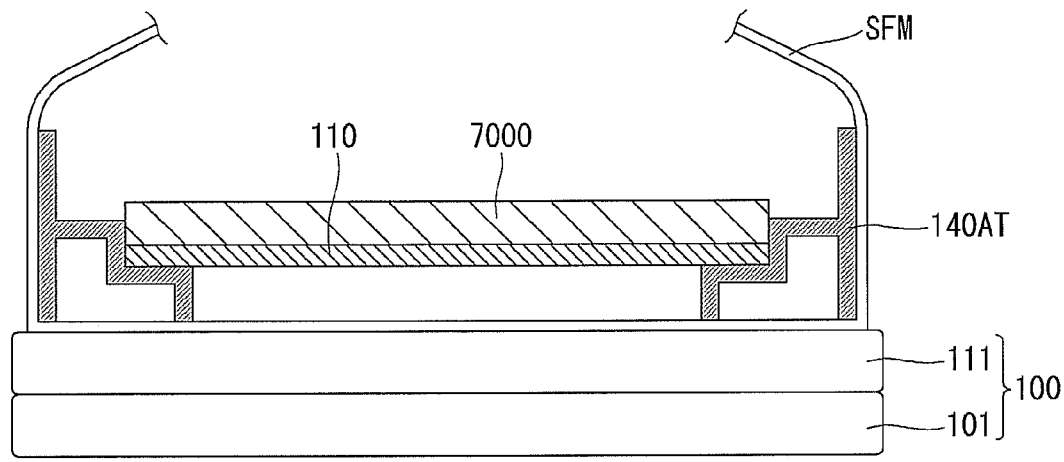

Alternatively, as shown in FIG. 15, a light guide plate 7000 may be disposed on the optical layer 110. In this instance, the backlight unit 10B may be the edge type backlight unit. Further, the edge type backlight unit 10B may include an edge type light source, the optical layer 110, and the light guide plate 7000. The edge type light source may be disposed on the side of the light guide plate 7000.

Figure 16:
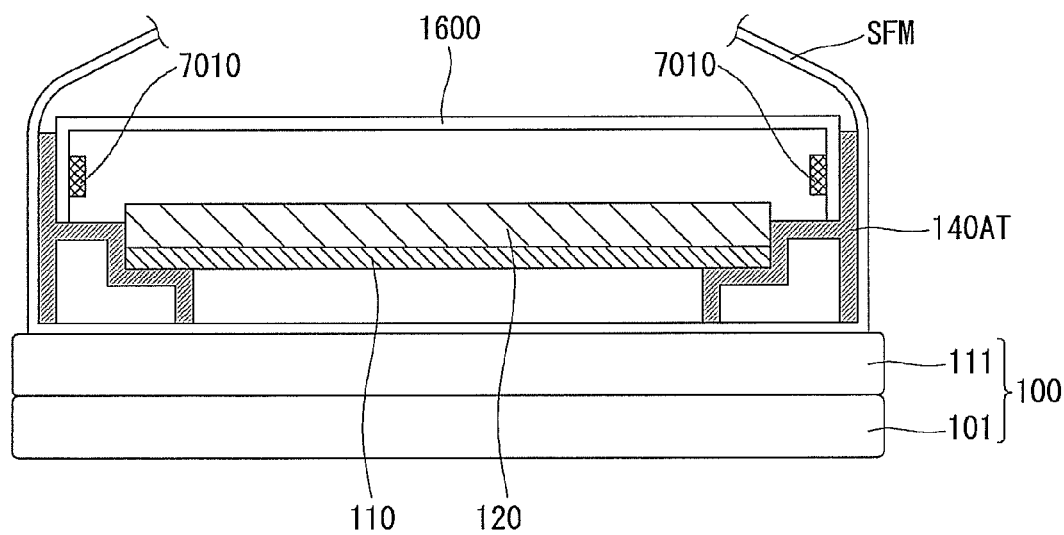

For example, as shown in FIG. 16, the frame 1600 may be disposed in the rear of the light guide plate 7000, and an edge type backlight unit 7010 may be disposed on an edge of the frame 1600 so as to correspond to the side of the light guide plate 7000.

As above, the display apparatus according to the embodiment of the invention may include the direct type backlight unit or the edge type backlight unit. In other words, both the direct type backlight unit and the edge type backlight unit may be applied to the embodiment of the invention. In the embodiment of the invention, the edge type backlight unit may be classified into a bottom edge type backlight unit including a bottom edge type light source and a side edge type backlight unit including a side edge type light source.

Figure 17:
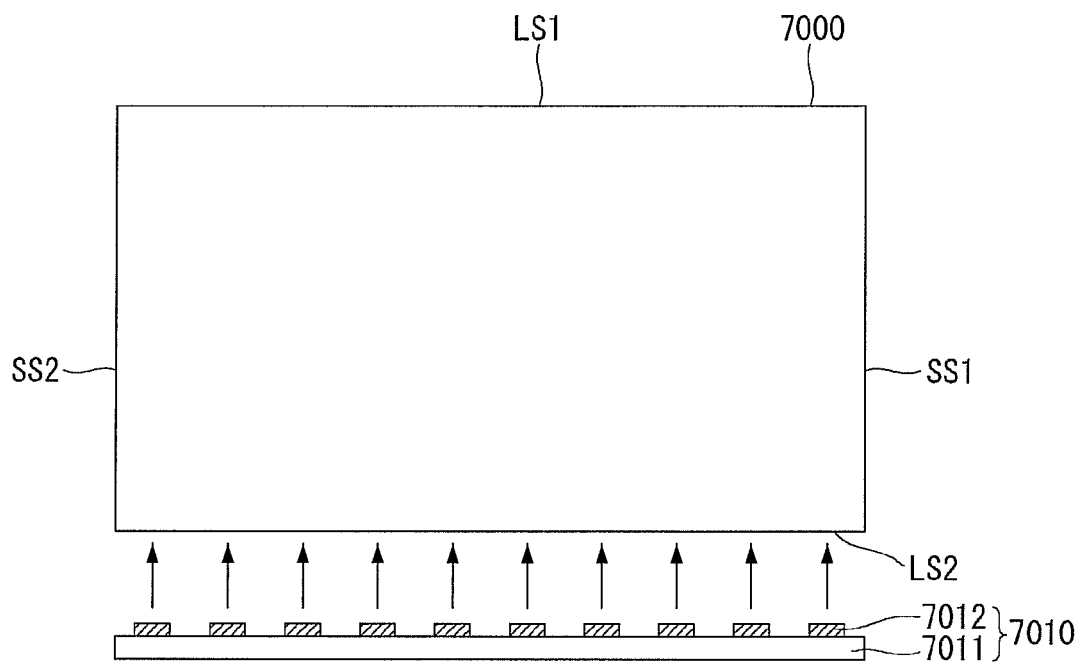

As shown in FIG. 17, a bottom edge type light source 7010 may emit light to the light guide plate 7000 positioned on the long side LS of the display panel 100. For example, the bottom edge type light unit 7010 including substrate 7011 and a bottom edge type light source 7012 may be positioned on the second long side LS2 corresponding to the lower side among the first and second long sides LS1 and LS2 of the display panel 100.

Figure 18:
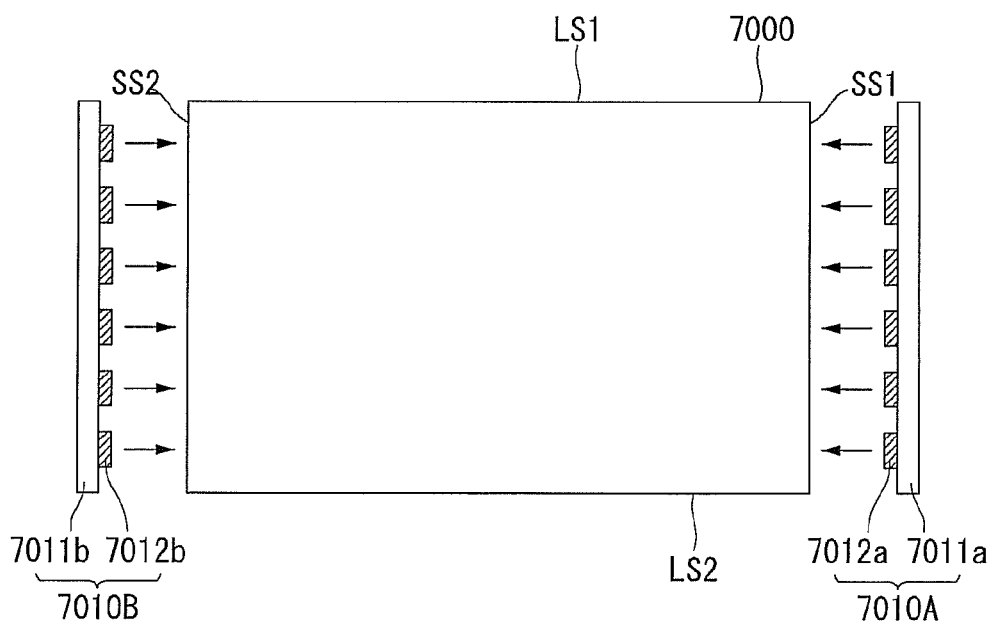

As shown in FIG. 18, a side edge type light source 7010 may emit light to the light guide plate 7000 positioned on the short side SS of the display panel 100. For example, a first side edge type light unit 7010A including a first substrate 7011a and a first side edge type light source 7012a may be positioned on the first short side SS1 of the display panel 100, and a second side edge type light unit 7010B including a second substrate 7011b and a second side edge type light source 7012b may be positioned on the second short side SS2 of the display panel 100.

The edge type backlight unit, which will be described below, may correspond to both the bottom edge type backlight unit and the side edge type backlight unit.

Figure 20:
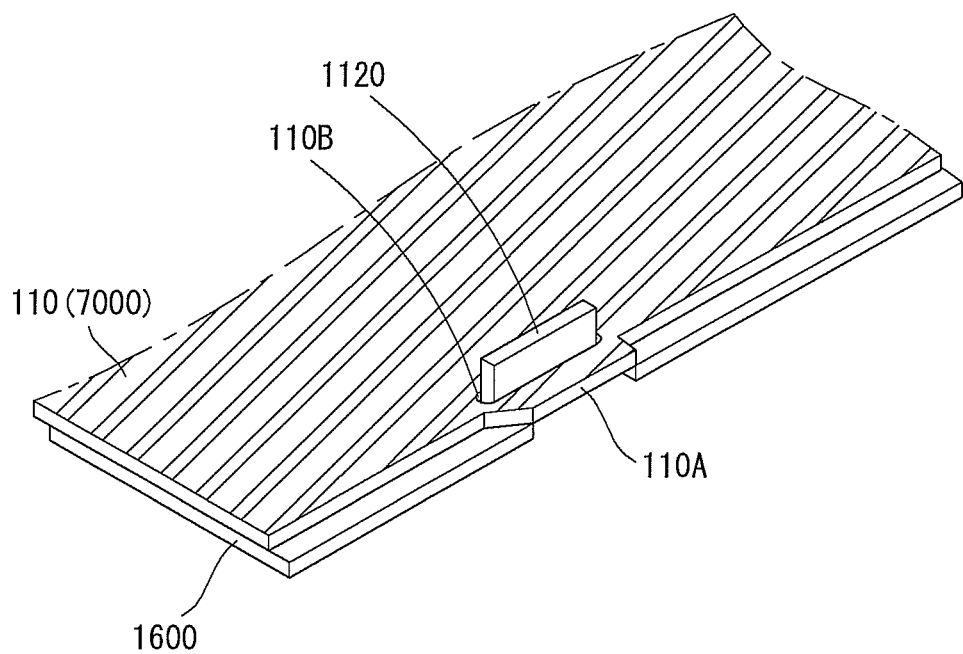

The optical layer 110 and/or the light guide plate 7000 may have at least one hole. FIG. 20 shows that the optical layer 110 has at least one hole 110B. Although not shown, the light guide plate 7000 may have at least one hole.

Figure 19:
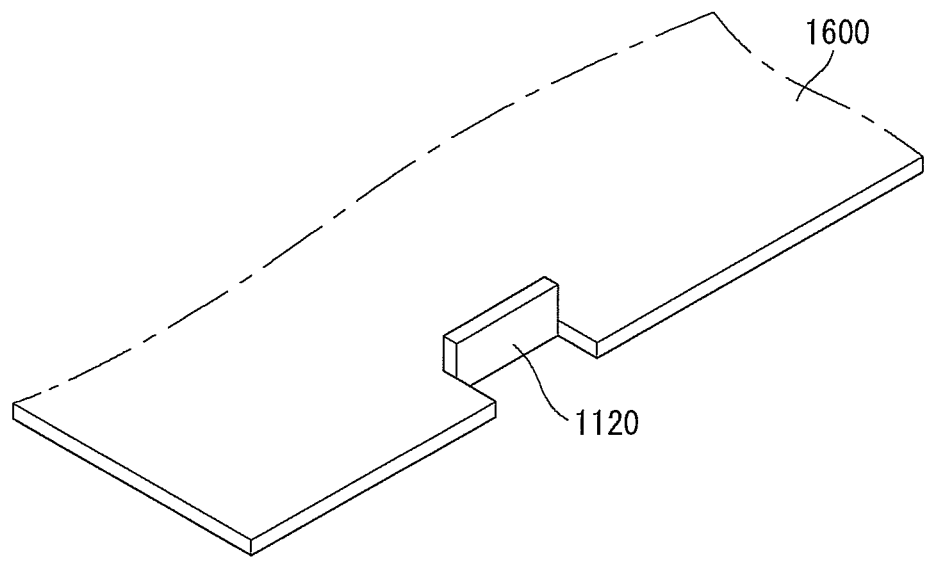

For example, as shown in FIGS. 19 and 20, the optical layer 110 may have the plurality of holes 110B.

And, the frame 1600 may include a protrusion 1120 corresponding to the hole 110B of the optical layer 110. More specifically, the frame 1600 may include the protrusion 1120, which corresponds to the hole 110B of the optical layer 110 and protrudes to the display panel 100.

As shown in FIG. 20, the optical layer 110 may be disposed on the frame 1600, so that the hole 110B corresponds to the protrusion 1120 of the frame 1600. Hence, the protrusion 1120 of the frame 1600 may pass through the hole 110B of the optical layer 110.

As above, when the hole 110B is disposed in the protrusion 110A of the optical layer 110 at a location corresponding to the protrusion 1120 of the frame 1600, the entire size of the optical layer 110 may be prevented from excessively increasing and the separation of the optical layer 110 from the frame 1600 may be prevented.

In this instance, the protrusion 110A of the optical layer 110 may be exposed through the side of the frame 1600. In other words, when the user sees the side of the frame 1600 in a state where the display panel 100, the optical layer 110, and the frame 1600 are combined with one another, the user may see the protrusion 110A of the optical layer 110.

Hereinafter, description will be made on the assumption that the light guide plate 7000 is disposed in the rear of the optical layer 110. The following also applies when the light source 120 is disposed in the rear of the optical layer 110, as previously shown in FIGS. 13 and 14.

Figure 21:
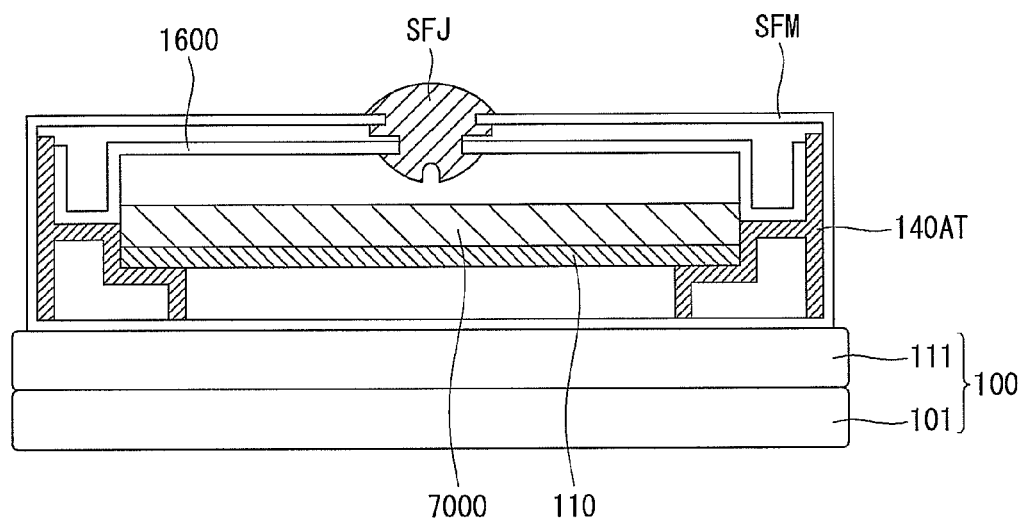

Referring to FIG. 21, the bracket 140AT, the optical layer 110, the light guide plate 7000, and the frame 1600 may be disposed in a space provided by the supporting film SFM in the rear of the display panel 100. Taking into consideration that the optical layer 110 and the optical guide plate 7000 are included in a backlight unit, the backlight unit may be disposed in an internal space of the supporting film SFM in the rear of the display panel 100.

The frame 1600 may be connected to the film joining portion SFJ. As such, the supporting film SFM may be connected to the frame 1600 through the film joining portion SFJ. In other words, a structure disposed in the internal space of the supporting film SFM is connected to the supporting film SFM by the film joining portion SFJ. To put it another way, a structure positioned in the internal space of the supporting film SFM may be connected indirectly to the display panel 100 by the supporting film SFM and the film joining portion SFJ.

With this configuration, the supporting film SFM may be attached to the back substrate 100, and another structure, i.e., the bracket 140AT, positioned inside the supporting film SFM may not be fixed to the display panel 100.

Figure 22:
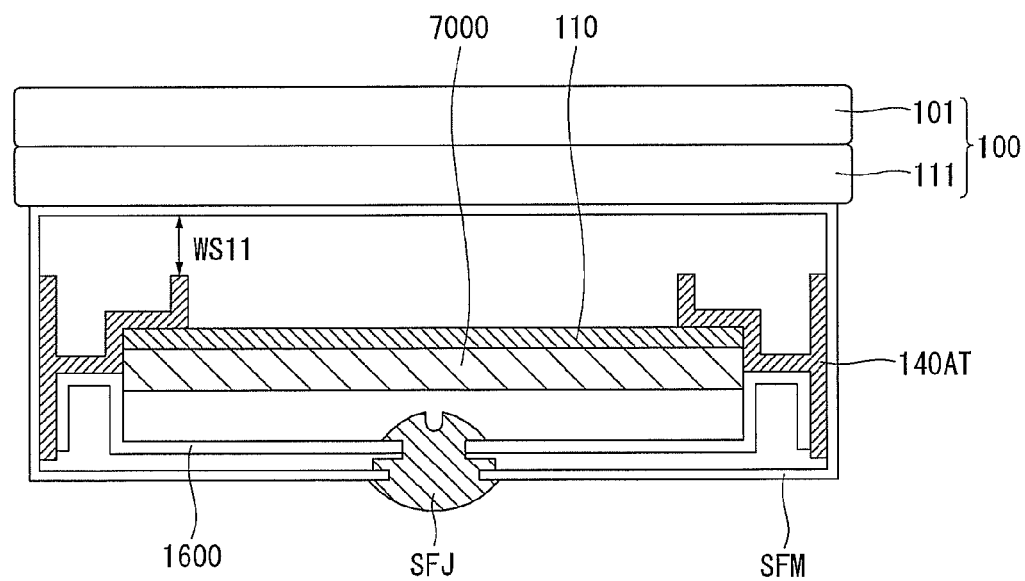

For example, as shown in FIG. 22, if the display apparatus is overturned—that is, the back substrate 111 of the display panel 100 is disposed under the front substrate 101—, the supporting film SFM with elasticity may stretch. Accordingly, structures disposed inside the supporting film SFM may be spaced a predetermined distance WS11 apart from the display panel.

With this configuration, an external force applied to a structure positioned in the internal structure of the supporting film SFM may be absorbed by the supporting film SFM. Thus, it is possible to fully prevent the external force applied to the structure from being transferred to the display panel 100. Therefore, light leakage can be further reduced.

Figure 23:
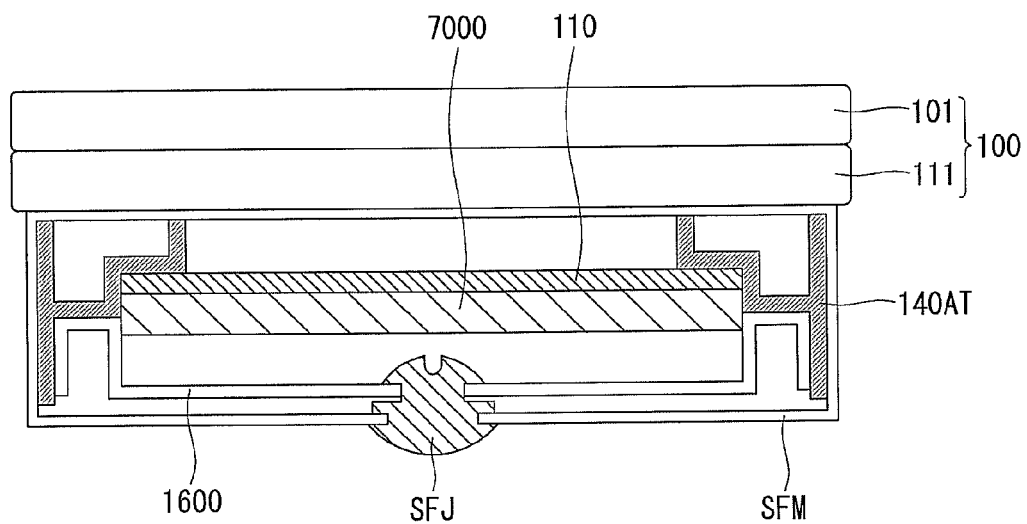

Alternatively, unlike FIG. 22, the supporting film SFM may not stretch, as shown in FIG. 23, even if the display apparatus is overturned.

Meanwhile, an adhesive layer for attaching the structure to the supporting film SFM may be formed between the supporting film SFM and the structure.

Figure 24:
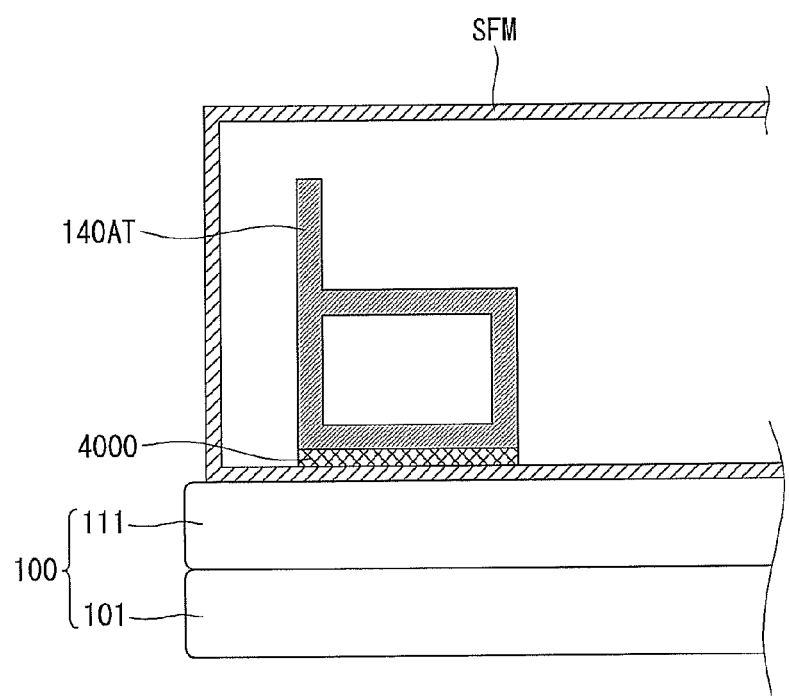

For example, as shown in FIG. 24, a first adhesive layer 4000 may be formed between the supporting film SFM and the bracket 140AT. In this case, movement of the bracket 140AT can be restrained well enough.

Figure 25:
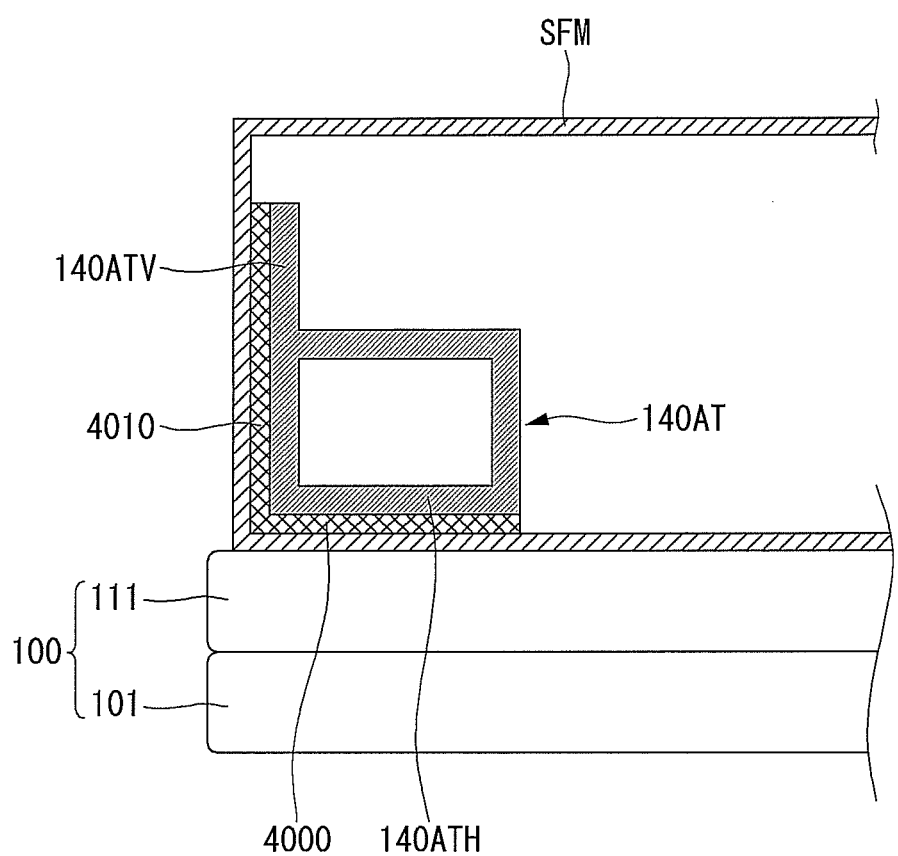

Referring to FIG. 25, the display apparatus may include a horizontal portion 140ATH extending in a horizontal direction DRH and a vertical portion 140ATV connected to the horizontal portion 140ATH and extending in a vertical direction DRV. If the bracket 140AT has the same shape as previously described in FIG. 11, the horizontal portion 140ATH of the bracket 140ATH may correspond to the fifth wall 474, and the vertical portion 140AT may correspond to the sidewall 400.

Moreover, the bracket 140AT may include a first adhesive layer 4000 for attaching the horizontal portion 140ATH of the bracket 140AT to the supporting film SFM and a second adhesive layer 4010 for attaching the vertical portion 140ATV of the bracket 140AT to the supporting film SFM.

Figure 26:
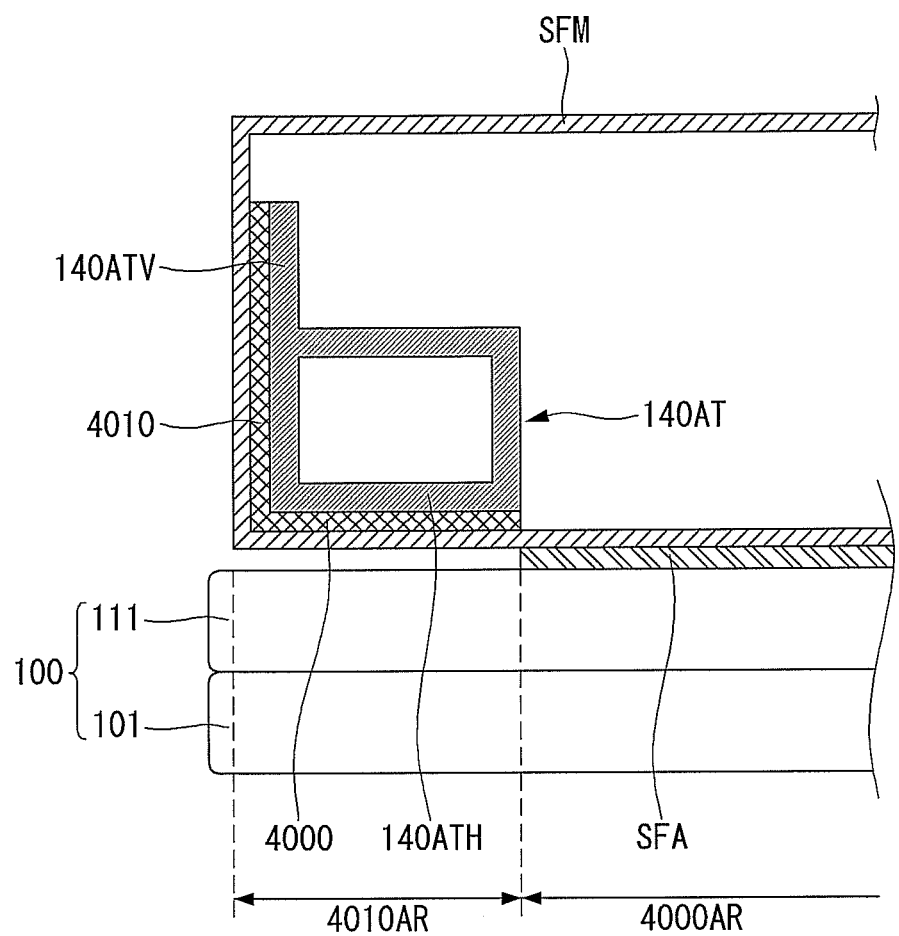

Referring to FIG. 26, the adhesive layer SFA may be formed between the supporting film SFM and the display panel 100 in an adhesive region 4000AR of the display panel, whereas the adhesive layer SFA may not be formed between the supporting film SFM and the display panel 1000 in a non-adhesive region 4010AR of the display panel 100. Also, the bracket 140AT may be disposed on the supporting film SFM in the non-adhesive region 4010AR of the display panel 100. In other words, the adhesive layer SFA may be omitted between the supporting film SFM and the display panel 100 in the area where the bracket 140AT is disposed. In this case, it is possible to more effectively prevent the external force applied to the bracket 140AT from being transferred to the display panel 100.

Meanwhile, the supporting film SFM may be disposed in a dummy area DA positioned outside an active area AA for displaying an image of the display panel 100.

Figure 27:
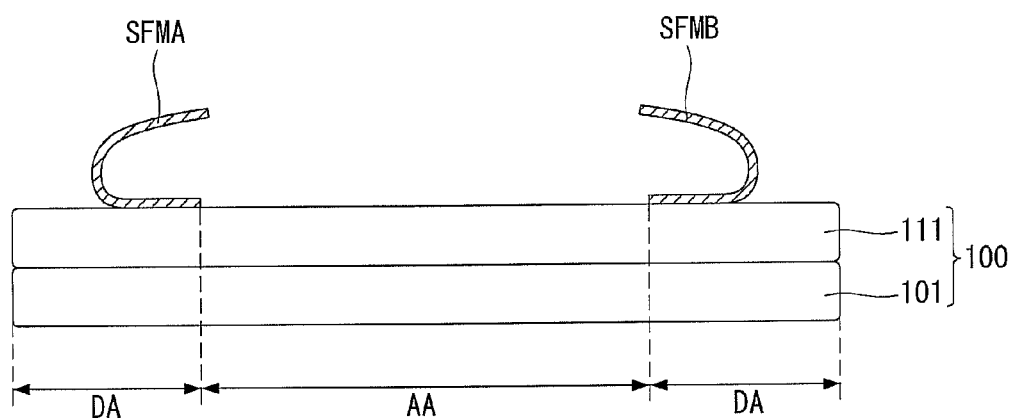

For example, as shown in FIG. 27, the supporting film SFM may be divided into a first sub-supporting film SFMA and a second sub-supporting film SFMB, and the first sub-supporting film SFMA and the second sub-supporting film SFMB may be disposed in the dummy area DA of the display panel 100. In this case, it is possible to prevent light generated from the backlight unit from being absorbed or blocked by the supporting film SFM and to increase the luminance of an image displayed on the display panel 100.

Figure 28:
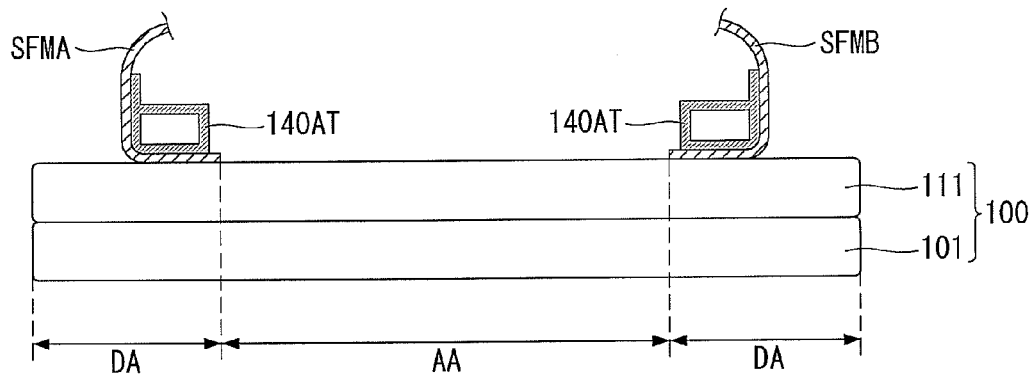

In this case, as shown in FIG. 28, the bracket 140AT may be disposed on the first and second sub-supporting films SFMA and SFMB.

Figure 29:
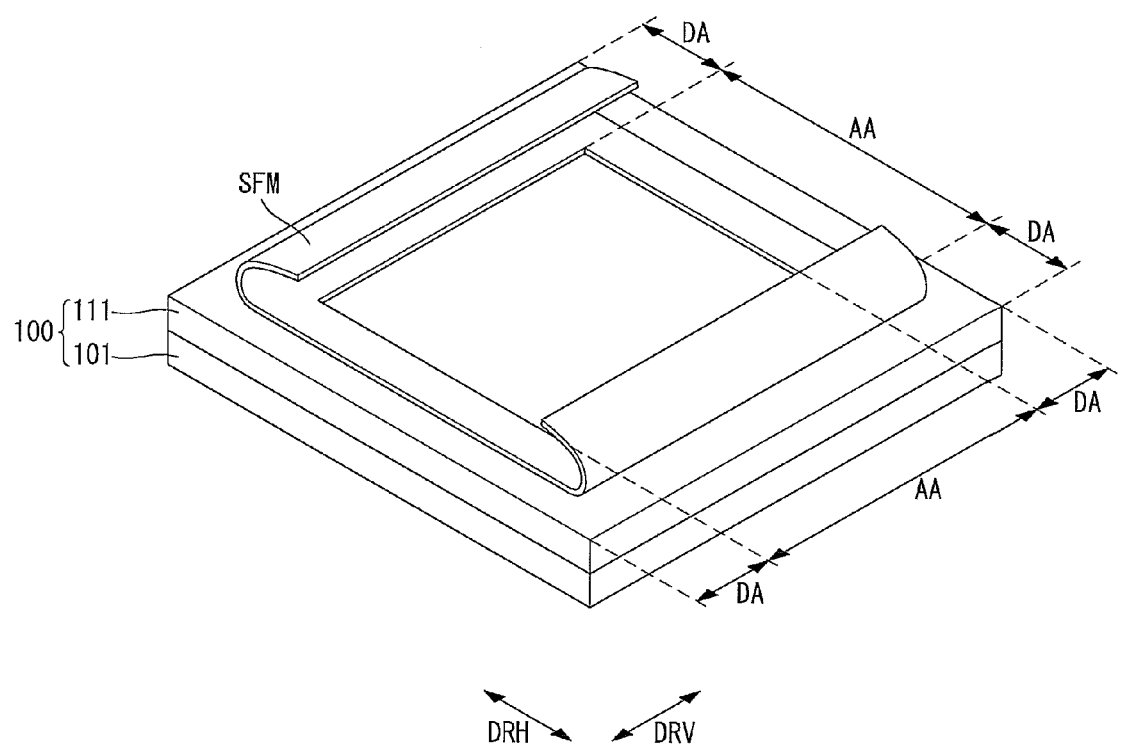

Alternatively, as shown in FIG. 29, the supporting film SFM may be disposed in such a manner as to surround the active area AA of the display panel 100. In this case, the supporting film SFM may include a portion parallel to the long side of the display panel and a portion parallel to the short side of the display panel 100.

Figure 30:
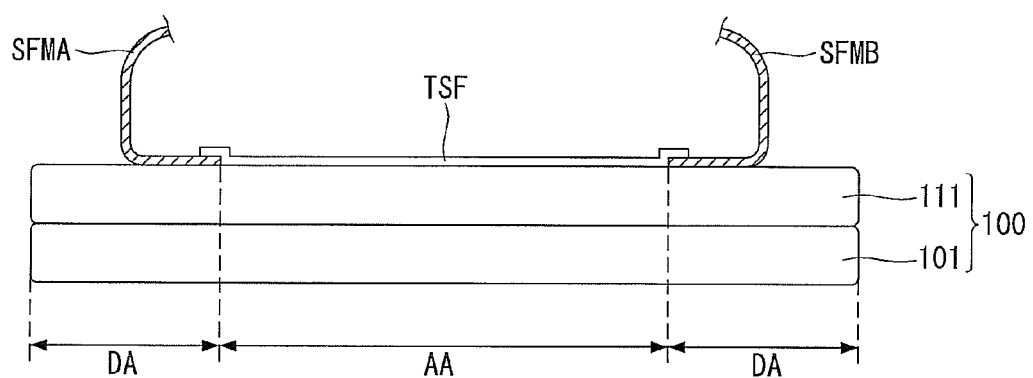

Referring to FIG. 30, the display apparatus may further include an active area film TSF attached to the active area AA of the display panel 100. The light transmittance of the active area film TSF may be higher than the light transmittance of the supporting film SFM, and the tensile strength of the supporting film SFM may be greater than the tensile strength of the active area film TSF. Here, the supporting film SFM may be referred to as a first supporting film, and the active area film TSF may be referred to as a second supporting film.

The supporting film SFM and the active area film TSF may include a mutually overlapping portion. More specifically, the active area film TSF may cover part of the supporting film TSF.

In this case, the luminance of an image displayed on the display panel 100 can be increased, and the attachment of the supporting film SFM can be enhanced, thereby improving structural stability.

Moreover, the active area film TSF may be a polarizing film. Taking into consideration that the active area film TSF is attached to the rear surface of the display panel 100, the active area film TSF may be a back polarizing film.

Figure 31:
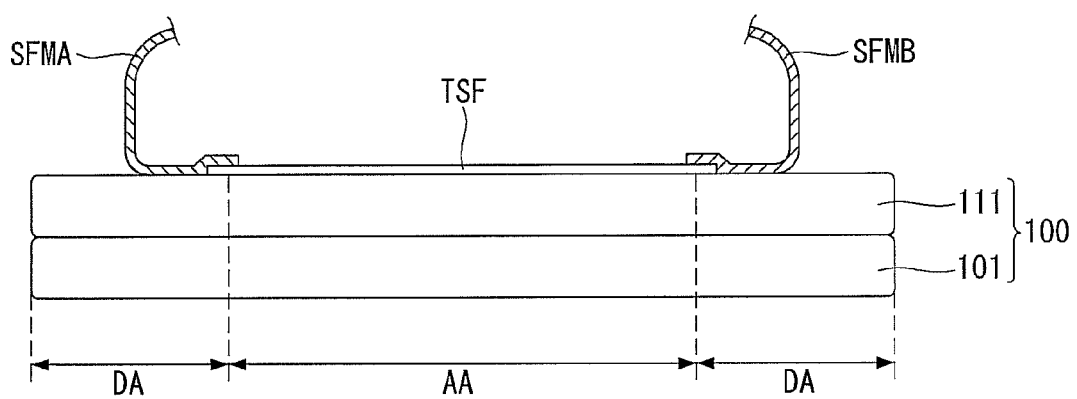

Alternatively, as shown in FIG. 31, the supporting film SFM may cover part of the active area film TSF.

Figure 32:
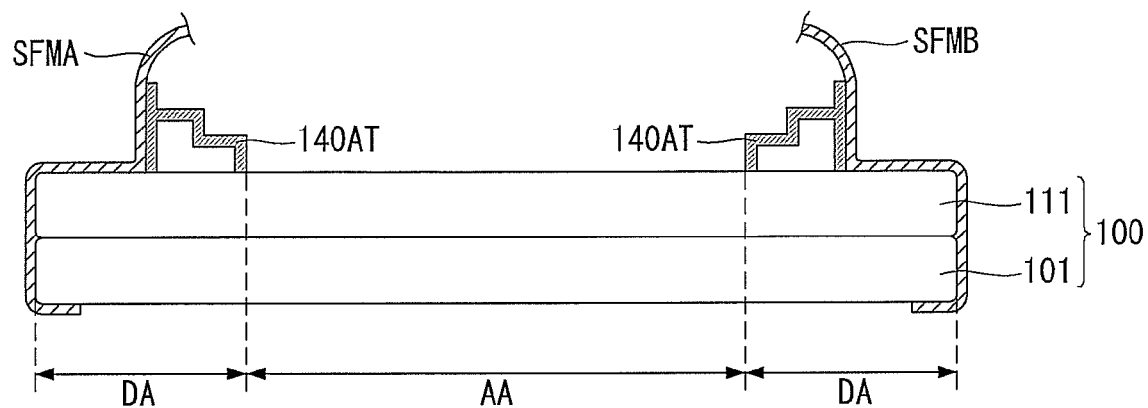

Referring to FIG. 32, the supporting film SFM may include a portion attached to the front surface of the front substrate 101. In this case, the supporting film SFM may include a portion attached to a side of the display panel 100. Also, to enhance the attachment of the supporting film SFM, the supporting film SFM may include a portion attached to the rear surface of the back substrate 111, as well as the portion attached to the front surface of the front substrate 101. In this case, too, a predetermined structure, for example, the bracket 140AT, may be supported by the supporting film SFM.

Figure 33:
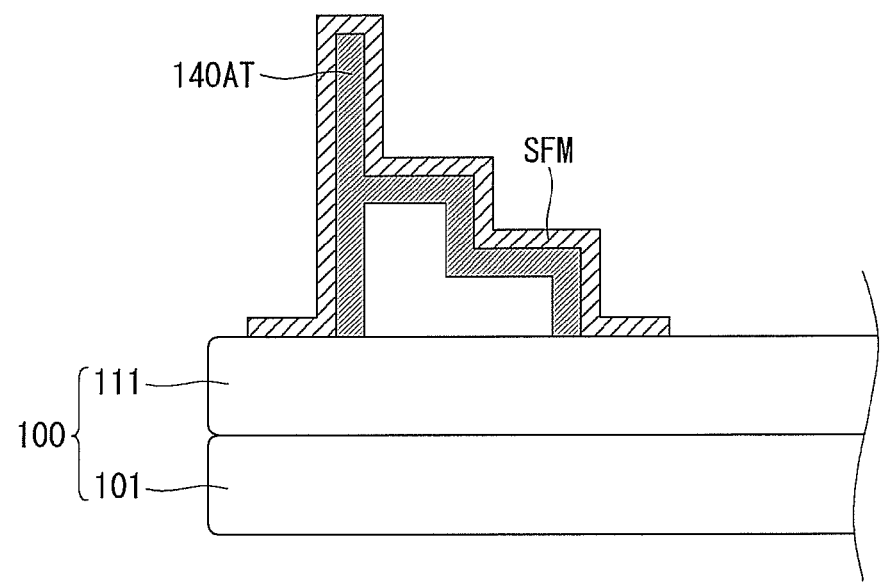

Alternatively, at least one surface of the structure may be covered with the supporting film SFM. For example, as shown in FIG. 33, the bracket 140AT may be covered with the supporting film SFM. In this case, it is preferable that the bracket 140aT is not attached to the display panel 100.

Figure 34:
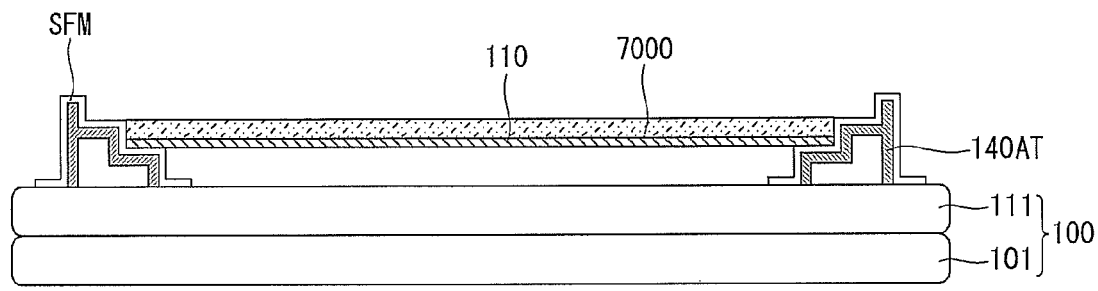

In this case, as shown in FIG. 34, an auxiliary bracket 4800 may be disposed on the bracket 140AT covered with the supporting film SFM, and the optical layer 110 may also be disposed on the auxiliary bracket 4800.

Figure 35:
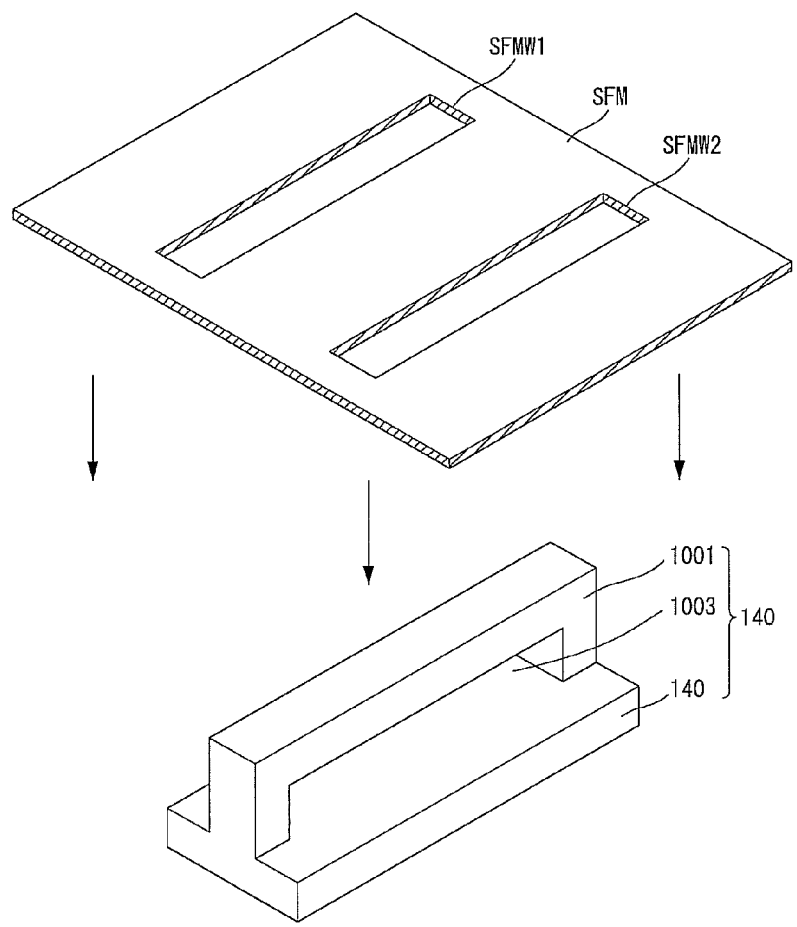
Figure 36:
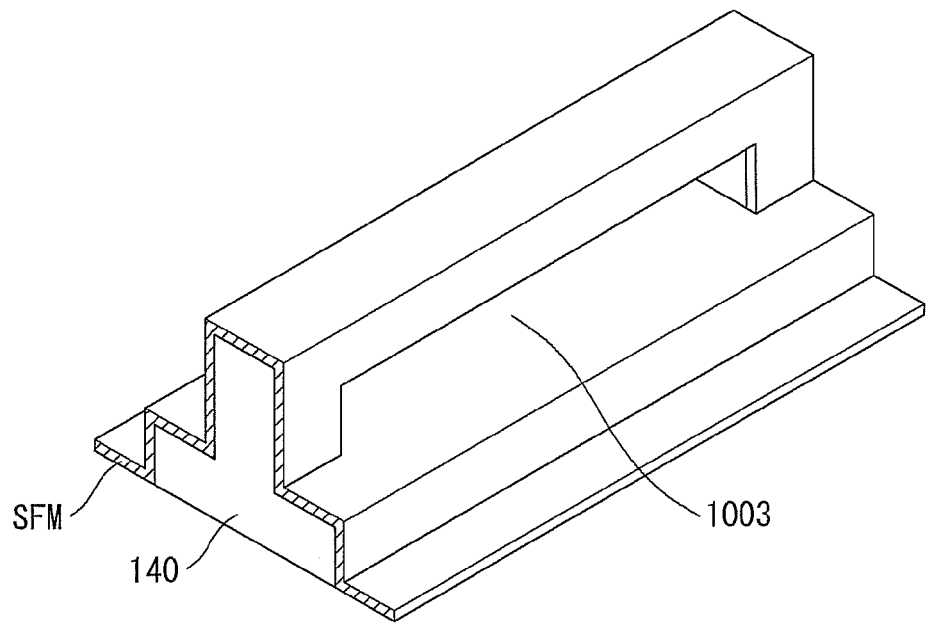

With this configuration, the bracket 140AT is not fixed to the display panel 100, but simply restrained by the supporting film SFM attached to the display panel 100. Thus, it is possible to effectively prevent the external force applied to the bracket 140AT Moreover, if the supporting film SFM covers the surface of the bracket 140AT and a hole is formed in the bracket 140AT, a hole corresponding to the hole of the bracket 140AT may be formed in the supporting film SFM as well. For example, as shown in FIG. 35, holes SFMW1 and SFMW2 may be formed in the supporting film SFM. These holes SFMW1 and SFMW2 may correspond to the entrance and exit of the hole 1003 of the bracket 140.

In this case, when the supporting film SFM is attached to cover the bracket 140, the holes SFMW1 and SFMW2 of the supporting film SFM correspond to the hole 1003 of the bracket 140, thereby preventing the hole 1003 of the bracket 140 from being blocked.

Figure 37:
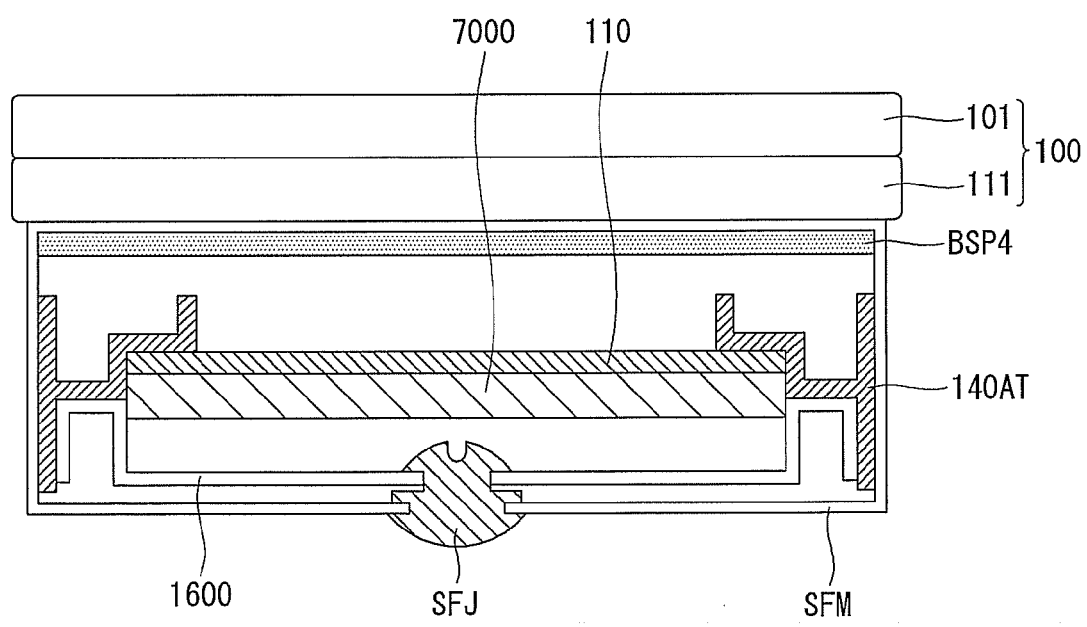

Referring to FIG. 37, to prevent damage to a structure and/or the display panel 10, which is caused by collision between the structure positioned inside the supporting film SFM and the back substrate 11 of the display panel 100, a buffer portion BSP4 may be formed between the structure and the supporting film SFM, for example, between the supporting film SFM and the backlight unit. The buffer portion BSP4 positioned between the structure and the supporting film SFM may be referred to as a fourth buffer portion.

The fourth buffer portion BSP4 may include an elastic material such as resin, silicon, etc.

The fourth buffer portion BSP4 may be attached to the supporting film SFM by an adhesive agent.

Moreover, the supporting film SFM may include a light transmissive material for transmitting light generated from the backlight unit to the display panel 100.

Figure 38:
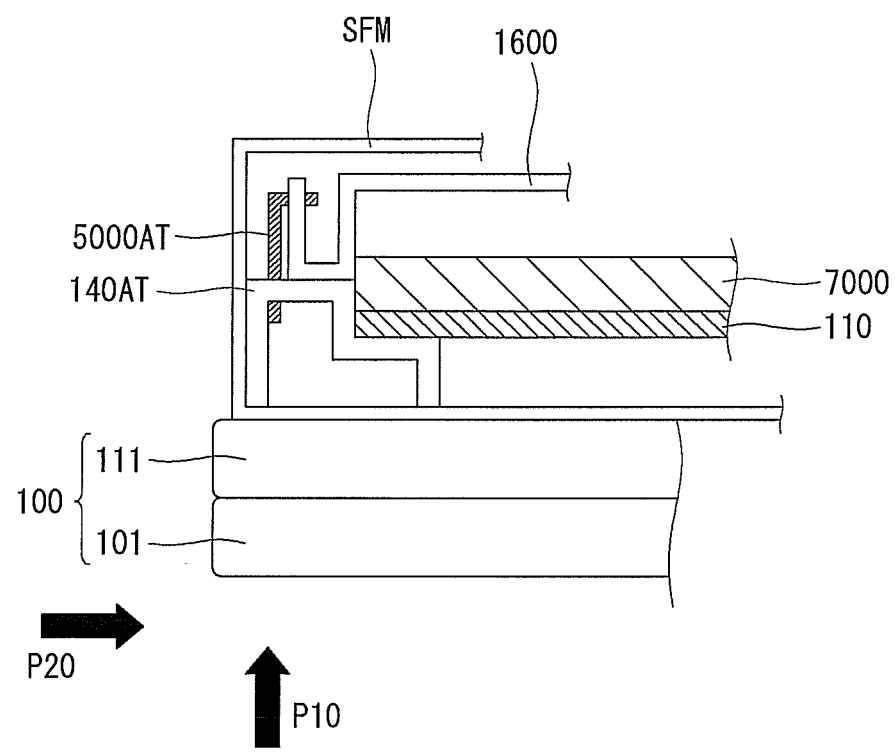

Referring to FIG. 38, the optical layer 110 and the light guide plate 7000 may be disposed on the bracket 140A, and a connecting frame 5000AT may connect the bracket 140AT and the frame 1600.

Moreover, with structures, such as the backlight unit, disposed in the internal space of the supporting film SFM, an edge of the front surface of the display panel 100 may be disposed, and a side of the display panel 100 may also be exposed. In this case, an observer situated point P10 can observe the edge of the front surface of the display panel 100, and an observer situated at point P20 can observe the side of the display panel 100.

Both ends of the supporting film SFM may be connected to the film joining portion SFJ in a sliding fashion.

Figure 39:
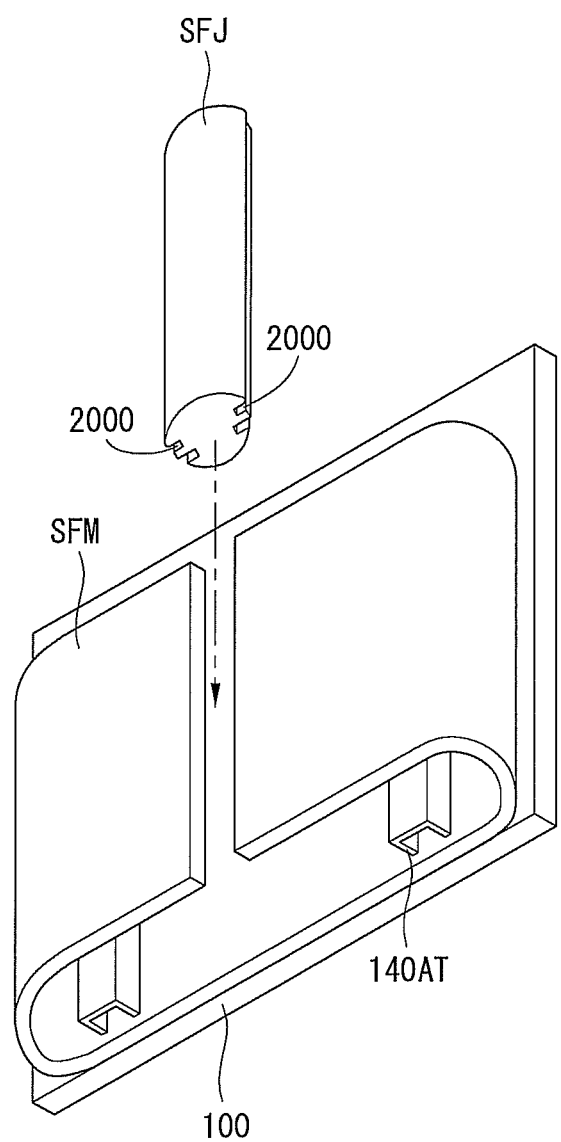

For example, as shown in FIG. 39, a first slot 2000 may be formed in a rail shape in the film joining portion SFJ. Also, the both ends of the supporting film SFM may be vertically inserted into the slot 2000 of the film joining portion SFJ in a sliding fashion.

Accordingly, the supporting film SFM may such a shape as to surround the structures inside it.

Figure 40:
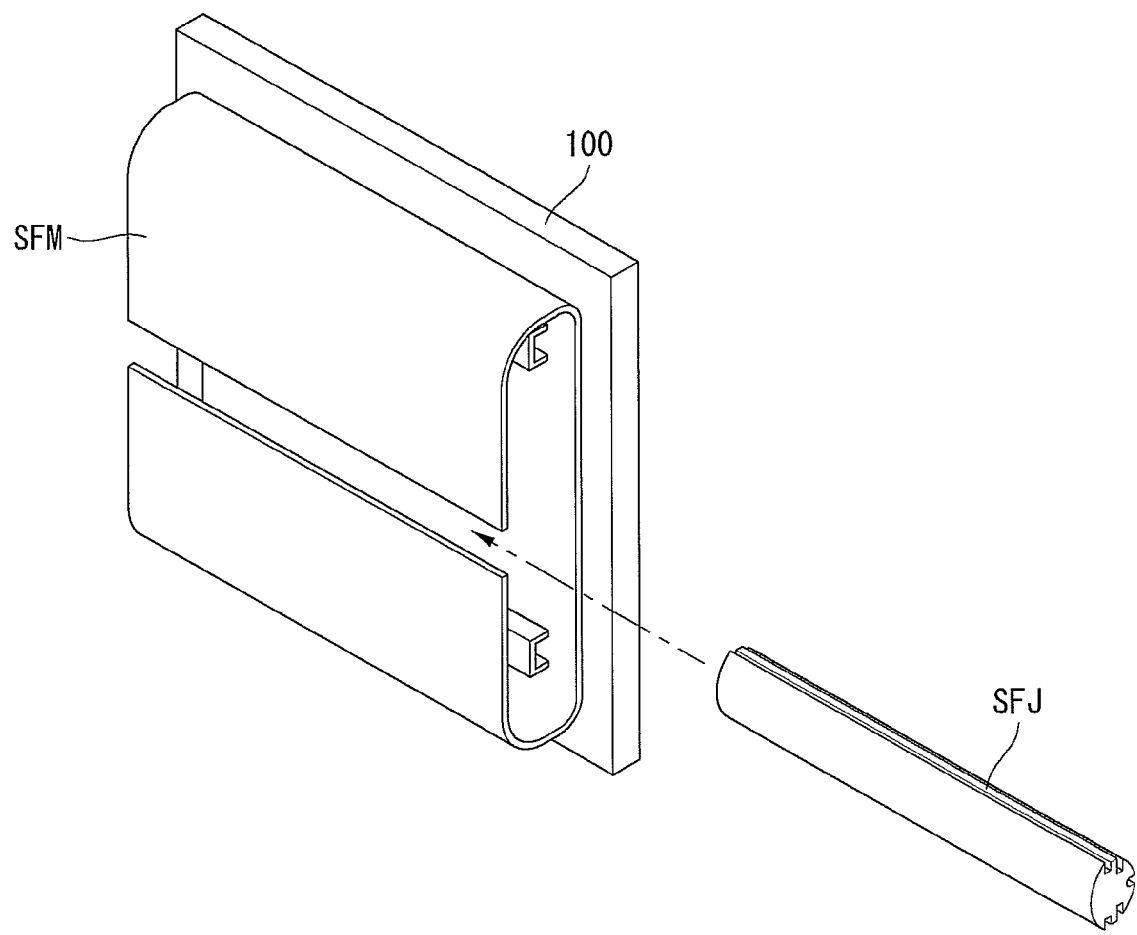

Alternatively, as shown in FIG. 40, the both ends of the supporting film SFM may be horizontally inserted into the slot 2000 of the film joining portion SFJ in a sliding fashion.

Figure 41:
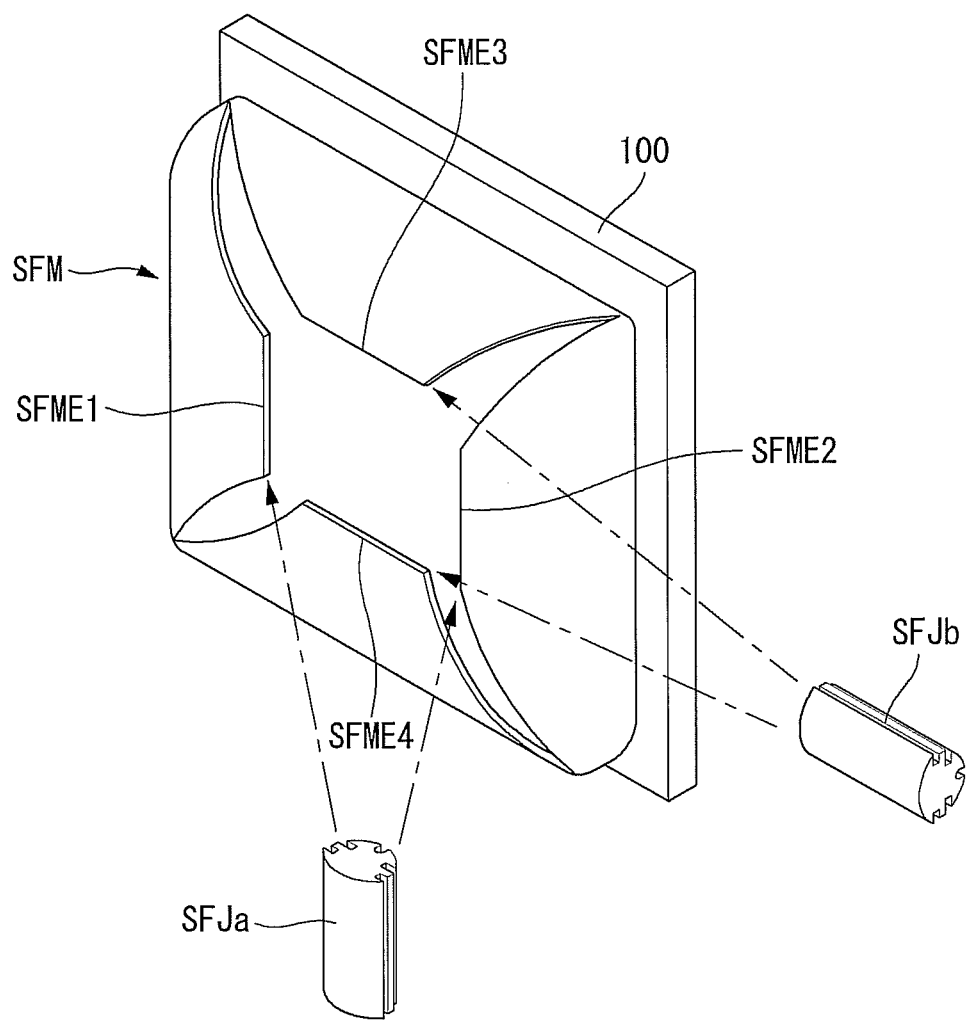

Alternatively, as shown in FIG. 41, the film joining portion SFJ may include a vertical film joining portion SFMJa that connect both ends SFM3 and SFME4 of the supporting film SFM facing each other in a vertical direction and a horizontal film joining portion SFMJb that connect both ends SFME1 and SFME2 of the supporting film facing each other in a horizontal direction.

Figure 42:
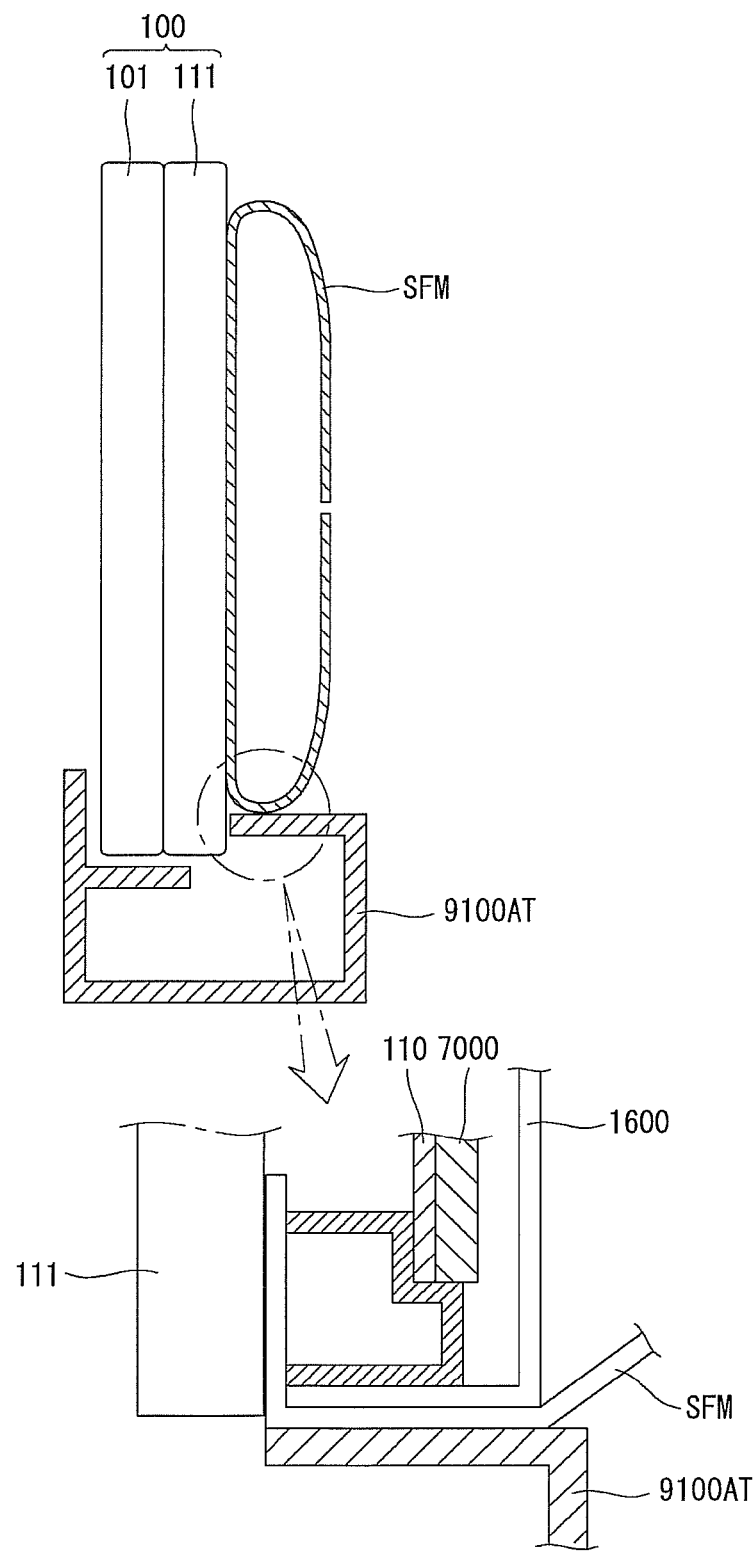

Referring to FIG. 42, a bottom cover 9100AT for covering at least part of the bottom of the front surface of the display panel 100 may be disposed on at least the bottom of the display panel 100. The bottom cover 9100AT may support the frame 1600.

Since the structures positioned in the internal space of the supporting film SFM are simply connected to the supporting film SFM through the film joining portion SF, if the bottom cover 9100AT supporting the frame 1600 is disposed on at least a bottom portion of the display panel 100, the structures positioned in the internal space of the supporting film SFM can be effectively supported, thereby improving structural stability.

Moreover, the supporting film SFM may include a portion positioned between the bottom cover 9100AT and the frame 1600. Although not shown, the bottom cover 9100AT and the frame 1600 may be fastened by predetermined fastening means.

Figure 43:
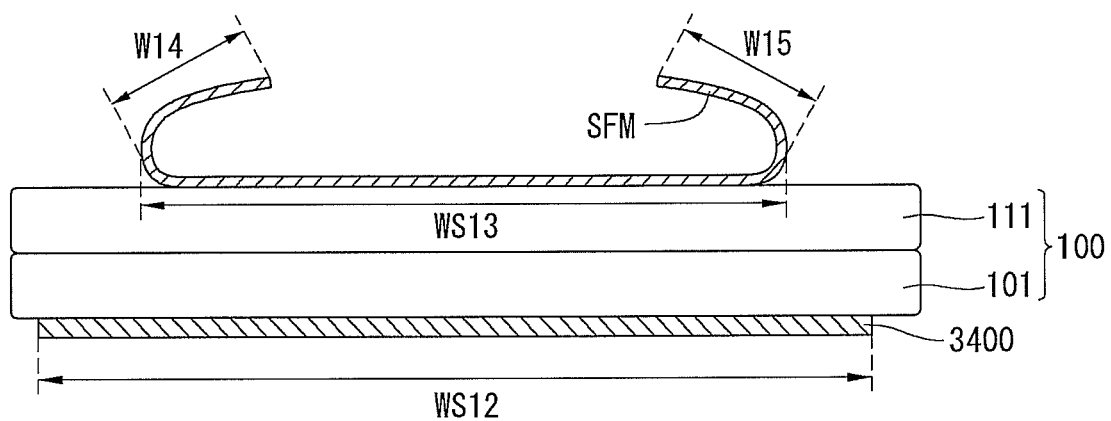

Referring to FIG. 43, a front polarizing film 3400 may be disposed on the front substrate 101. Also, the supporting film SFM may be a polarizing film for polarizing incident light. The supporting film SFM may be referred to as a back polarizing film because the supporting film SFM is disposed on the back substrate 111. In other words, it can be seen that the back polarizing film disposed on the back substrate 100 restrain structures such as the backlight unit.

Preferably, the length WS12 of a contact portion between the front polarizing film 3400 and the front substrate 101 is greater than the length WS13 of a contact portion between the supporting film SFM and the back substrate 111.

On the other hand, the total length (WS14+WS15+WS13) of the supporting film SFM may be greater than the total length WS12 of the front polarizing film 3400.

Preferably, the supporting film SFM has sufficiently high rigidity because it restrains structures disposed in the rear of the display panel 100.

Figure 44:
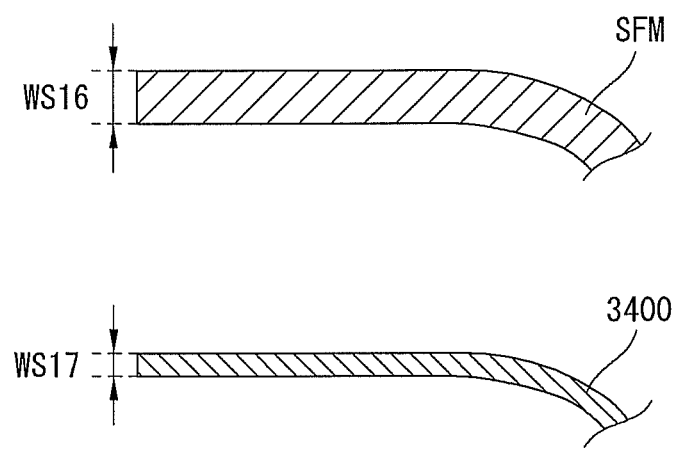

Accordingly, as shown in FIG. 44, the thickness WS16 of the supporting film SFM may be preferably greater than the thickness WS17 of the front polarizing film 3400.

Figure 45:
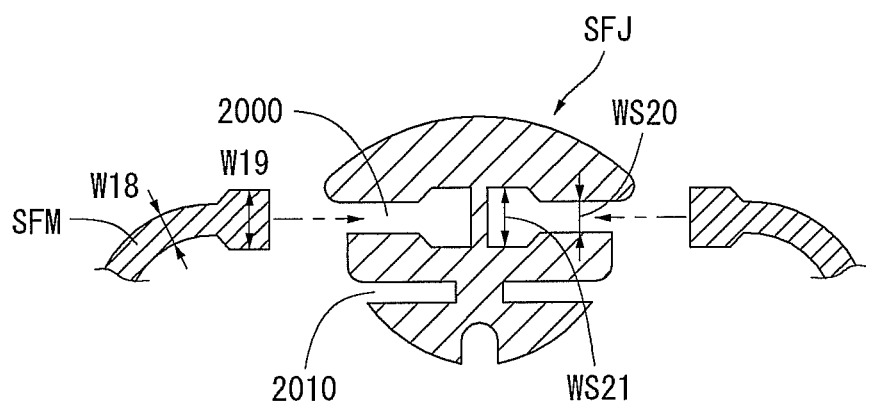

Referring to FIG. 45, the width of the ends of the supporting film SFM may be relatively large. More specifically, the width WS19 of both ends of the supporting film SFM may be preferably greater than the width WS18 of the portion between the both ends of the supporting film SFM.

Moreover, the internal width WS21 of the slot 2000 of the film joining portion SFJ may be greater than the width WS20 of the entrance thereof. In this case, the both ends of the supporting film SFM may be firmly inserted into the slot 2000 of the film joining portion SFJ. Accordingly, structural stability can be improved.

Moreover, the film joining portion SFJ may preferably include another slot 2010 into which the frame 1600 is inserted, in addition to the slot 2000 corresponding to the supporting film SFM.

Figure 46:
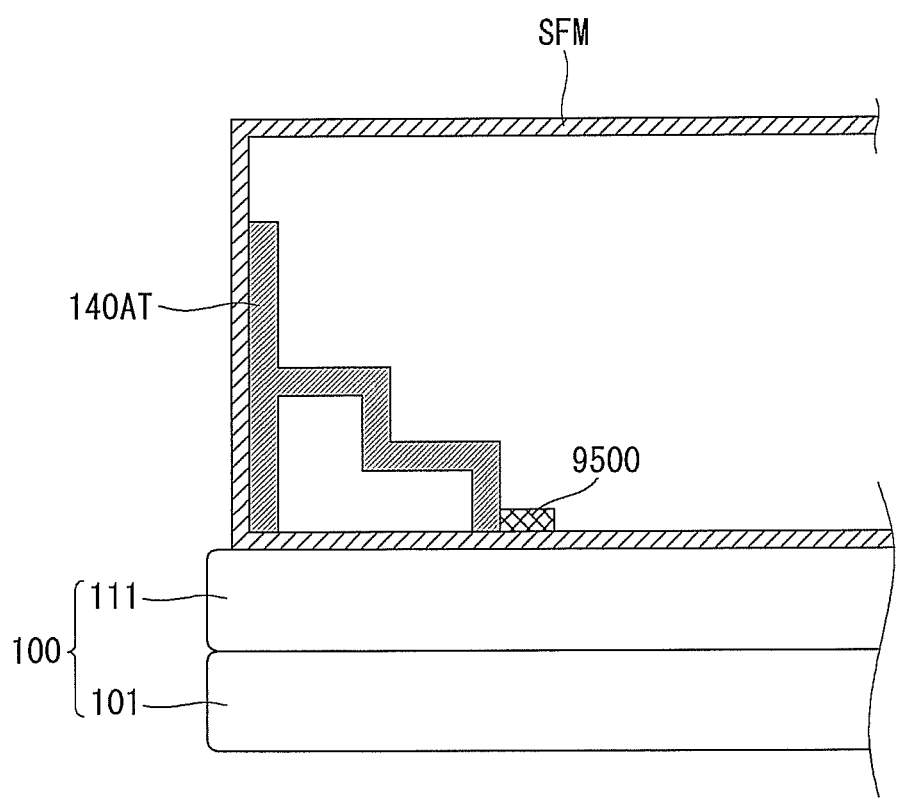

Alternatively, as shown in FIG. 46, if the bracket 140AT is disposed on the supporting film SFM, the supporting film SFM may include a protrusion 9500 for restraining movement of the bracket 140AT.

The protrusion 9500 can prevent the bracket 140AT from moving toward the center of the display panel 100 on top of the supporting film SFM.

The protrusion 9500 may be attached and formed onto the surface of the supporting film SFM.

Meanwhile, the both ends of the supporting film SFM may be connected to different film joining portions.

Figure 47:
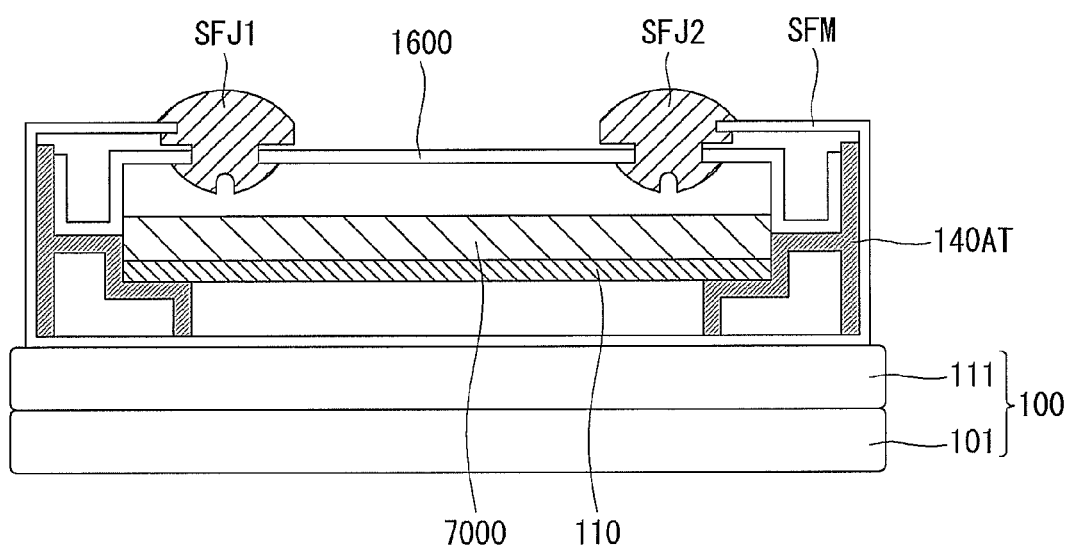

For example, as shown in FIG. 47, one end of the supporting film SFM may be connected to a first film joining portion SFJ1, and the other end of the supporting film SFM may be connected to a second film joining portion SFJ2.

Moreover, the first film joining portion SFJ1 and the second film joining portion SFJ2 may be connected to the frame 1600.

Figure 48:
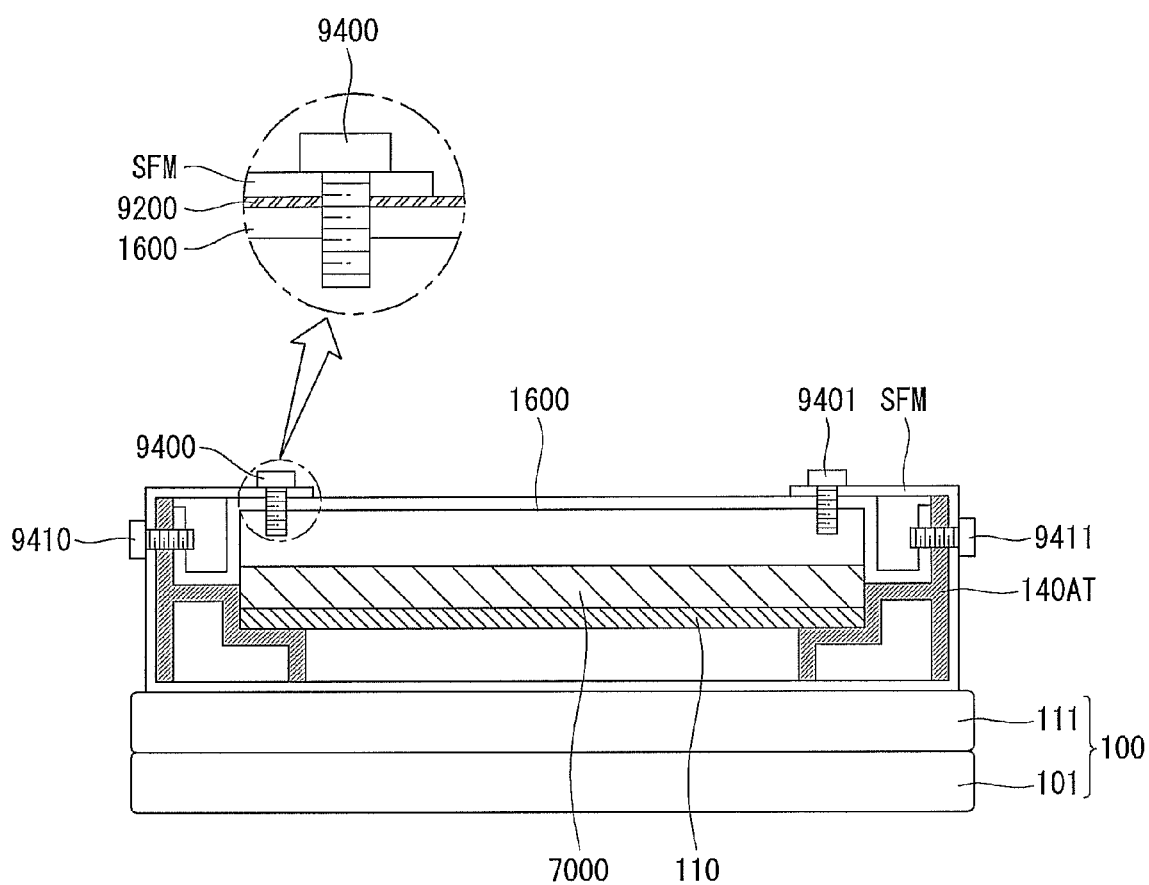

Alternatively, as shown in FIG. 48, the display apparatus may further include fastening means 9410 and 9411 for fastening the bracket 140AT and the supporting film SFM. In this case, structural stability can be further improved.

Moreover, the display apparatus may further include fastening means 9400 and 9401 for fastening the frame 1600 and the supporting film SFM. In this case, structural stability can be improved, and the film joining portion may be omitted. Further, the supporting film SFM may be attached to the frame 1600. In other words, an adhesive layer 9200 may be disposed between the supporting film SFM and the frame 1600 to thus attach the supporting film SFM to the frame 1600.

Figure 49:
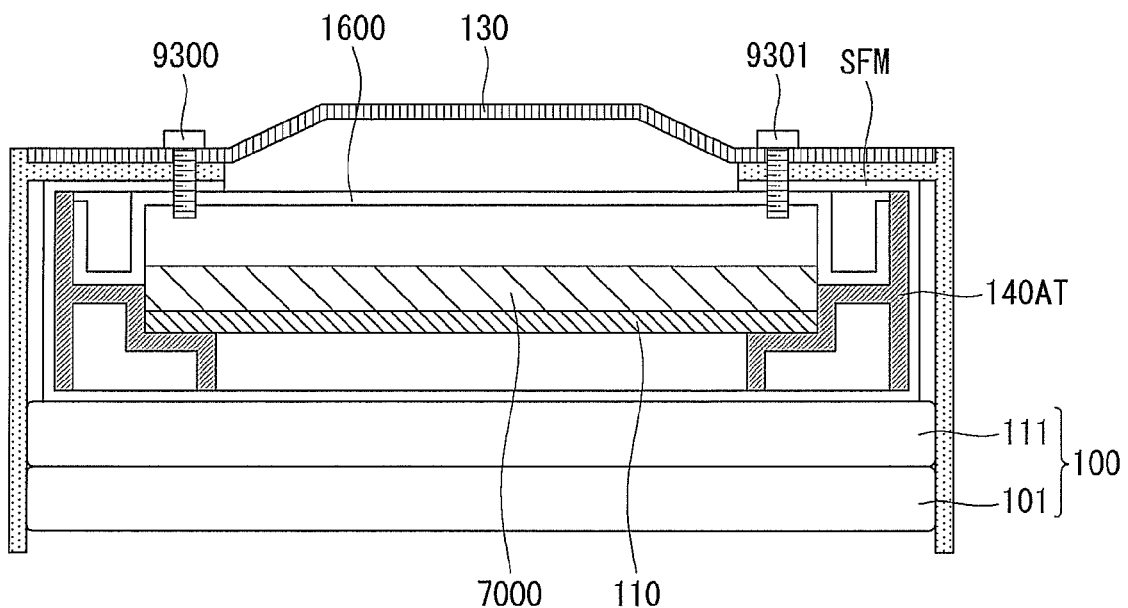

Referring to FIG. 49, the display apparatus may include a side cover 4400 including a portion that covers the side of the display panel 100 and a back cover 130 positioned in the rear of the display panel 100 and connected to the side cover 4400.

In this instance, the back cover 130, the side cover 4400, and the frame 1600 may be fastened to one another using a fastening member 9300, 9301. In this instance, the back cover 130, the side cover 4400, and the frame 1600 may be electrically connected to one another using the fastening member 9300, 9301. Hence, electromagnetic interference (EMI) may be reduced. In this case, the side cover 4400 includes hole, the frame 1600 includes hole corresponding to the hole of the side cover 4400, and the back cover 130 includes hole corresponding to the hole of the side cover 4400 and the hole of the frame 1600. And, the fastening member 9300, 9301 penetrates the hole of the side cover 4400, the hole of the frame 1600, and hole of the back cover 130.

Figure 50:
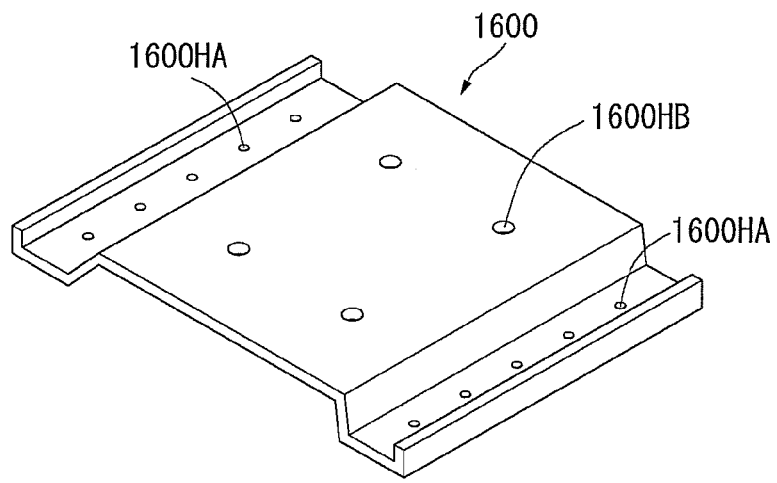

As shown in FIG. 50, the frame 1600 may have at least one hole. For example, the frame 1600 may have at least one first hole 1600HA and at least one second hole 1600HB.

As shown in FIGS. 49 and 50, the first hole 1600HA and/or the second hole 1600HB may correspond to the fastening member S400 for fastening the frame 1600 to the back cover 130 and the side cover 4400. And, the first hole 1600HA or the second hole 1600HB may be used to fasten the frame 1600 to a predetermined structure, for example, the back cover 130 or may be used as a hole through which another structure passes.

Figure 51:
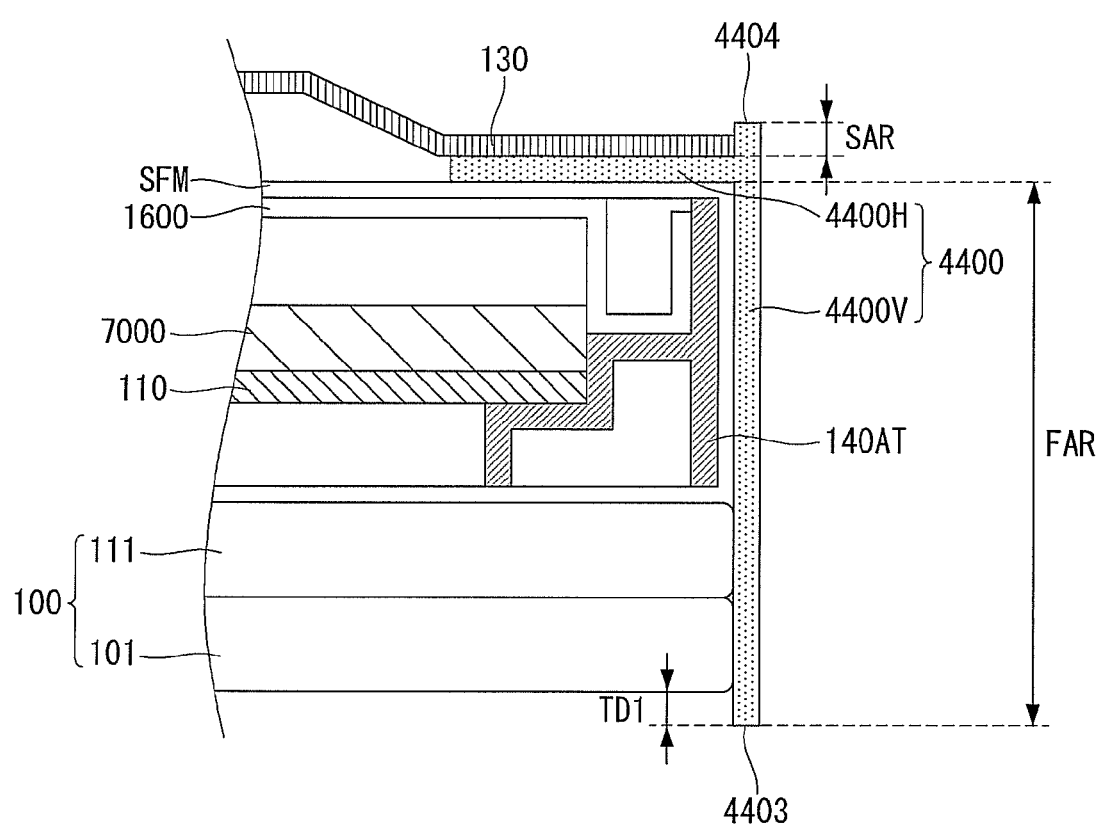
Figure 52:
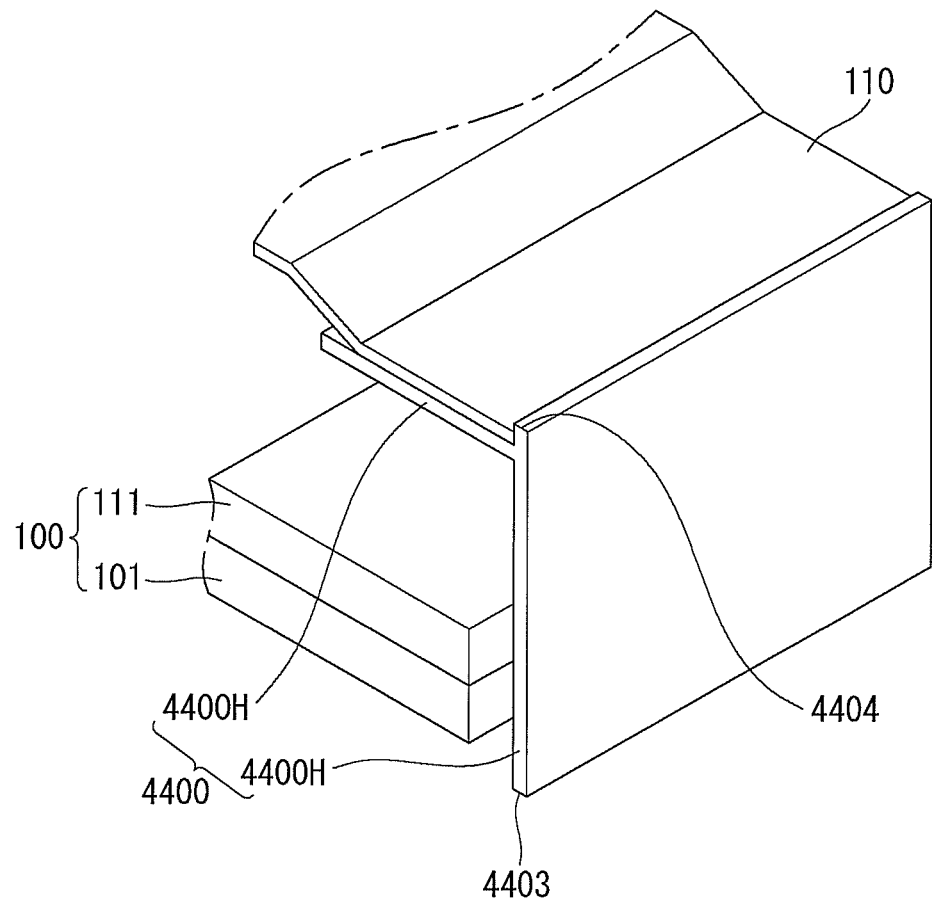

As shown in FIGS. 51 and 52, the side cover 4400 including a portion positioned on the side of the display panel 100 may be connected to the frame 1600. In other word, the side cover 4400 provided adjacent to sides of the front and back substrate 101, 111.

The side cover 4400 may prevent a foreign material such as dust from being penetrated into the display apparatus and may protect the side of the display panel 100 from a damage.

The back cover 130 is disposed in the rear of the display panel 100 and may be connected to the side cover 4400. In other word, the back cover 130 is provided on the side cover 4400.

For example, as shown in FIGS. 51 and 52, the side cover 4400 may include a portion which extend in the direction toward the middle of the display panel 100, so as to more efficiently fix the side cover 4400.

In this instance, the side cover 4400 may include a portion positioned between the back cover 130 and the display panel 100 in a width direction (i.e., a vertical direction) of the display panel 100.

An edge of the front surface of the display panel 100 may be exposed in a state where the back cover 130 is connected to the side cover 4400. The exposure of the edge of the front surface of the display panel 100 may indicate that an edge of a front surface of the front polarizing film 3400 attached to the front substrate 101 is exposed. Alternatively, the exposure of the edge of the front surface of the display panel 100 may indicate that an edge of the front surface of the front substrate 101 is exposed.

In this instance, when the observer in the front of the display panel 100 (i.e., at a first position P1) views the display panel 100, the observer may observe almost the entire area of the display panel 100. Hence, an attractive appearance of the display panel 100 may be provided. Further, because another edge of the side of the display panel 100 may not be showed to the observer, a visual effect, in which the observer may feel that the screen size of the display panel 100 is greater than the real screen size of the display panel 100, may be obtained.

In other word, the side cover 4400 includes a sidewall 4400V and an overhang portion 4400H extending in the first direction (i.e., a horizontal direction DRH), a first end portion 4403 of the sidewall 4400V covers the sides of the front and back substrates 101, 111. And, the overhang portion 4400H being provide at the second end portion 4404, which opposite from the first end portion, and the overhang portion being space from an end of the sidewall 4400V by a prescribed distance in the second direction (i.e., a vertical direction DRV) such that the side cover 4400 provides a rim for a back cover 130. In other word, the overhang portion 4400H may provided between the first end portion 4403 and the second end portion 4404, and the overhang portion being spaced from the first end portion 4403 and the second end portion 4404. And, an end of the back cover 130 positioned at a portion adjacent to a joint between the sidewall 4400V and the overhang portion 4400H. The sidewall 4400V may be referred to as a first portion 4400V of the side cover 4400, and the overhang portion 4400H may be referred to as a second portion 4400H of the side cover 4400.

In other word, the first portion 4400V comprises a first area FAR between the first end portion 4403 and the second portion 4400H and a second area SAR between the second end portion 4404 and the second portion 4400H. And, an end of the back cover 130 positioned at the second area SAR. In this instance, the back light unit and the panel 100 is positioned at a portion adjacent to the first area FAR.

And, as shown in FIG. 52, the side wall 4400V of the side cover 4400 may extended in the third direction DRZ.

As shown in FIG. 51, the side cover 4400 may include a portion extending further than the front substrate 101 by a predetermined distance TD1 in the front direction of the front substrate 101. In other words, the side cover 4400 may include a portion protruding further than the front substrate 101 in the front of the display panel 100. Even in this case, the edge of the front surface of the front substrate 101 may be exposed.

As above, when the side cover 4400 protrudes further than the front substrate 101, the side cover 4400 may protect more efficiently the front substrate 101.

Figure 53:
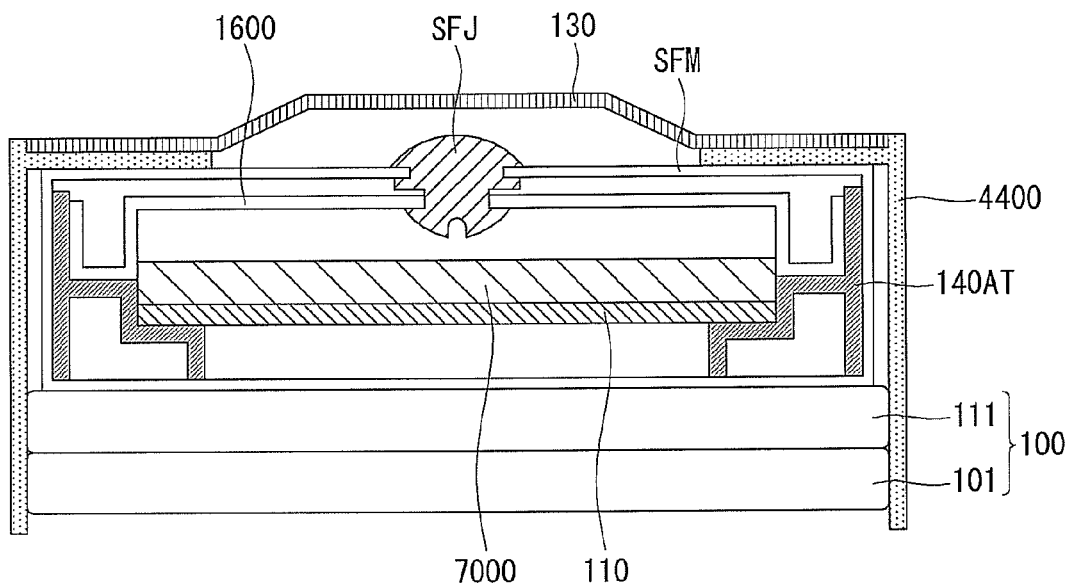

Referring to FIG. 53, the side cover 4400 and the back cover 130 may be used even when the film joining portion SFJ is used to fix the supporting film SFM. In this case, although not shown, the film joining portion SFJ may be connected to the back cover 130 and/or the side cover 4400, or the supporting film SFM may be connected to the side cover 4400 and/or the back cover 130.

Meanwhile, a vertical part 4400V (side wall or first portion) of the side cover 4400 may include a portion having different widths.

Figure 54:
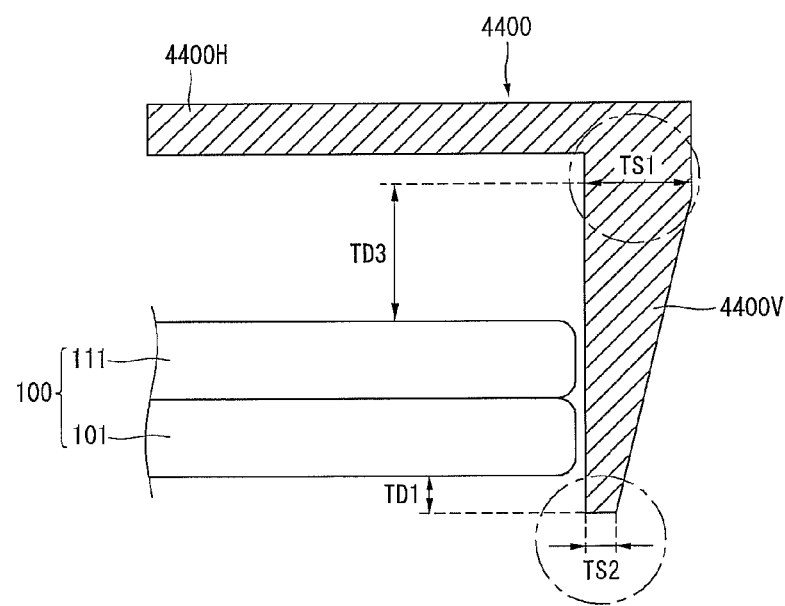
Figure 55:
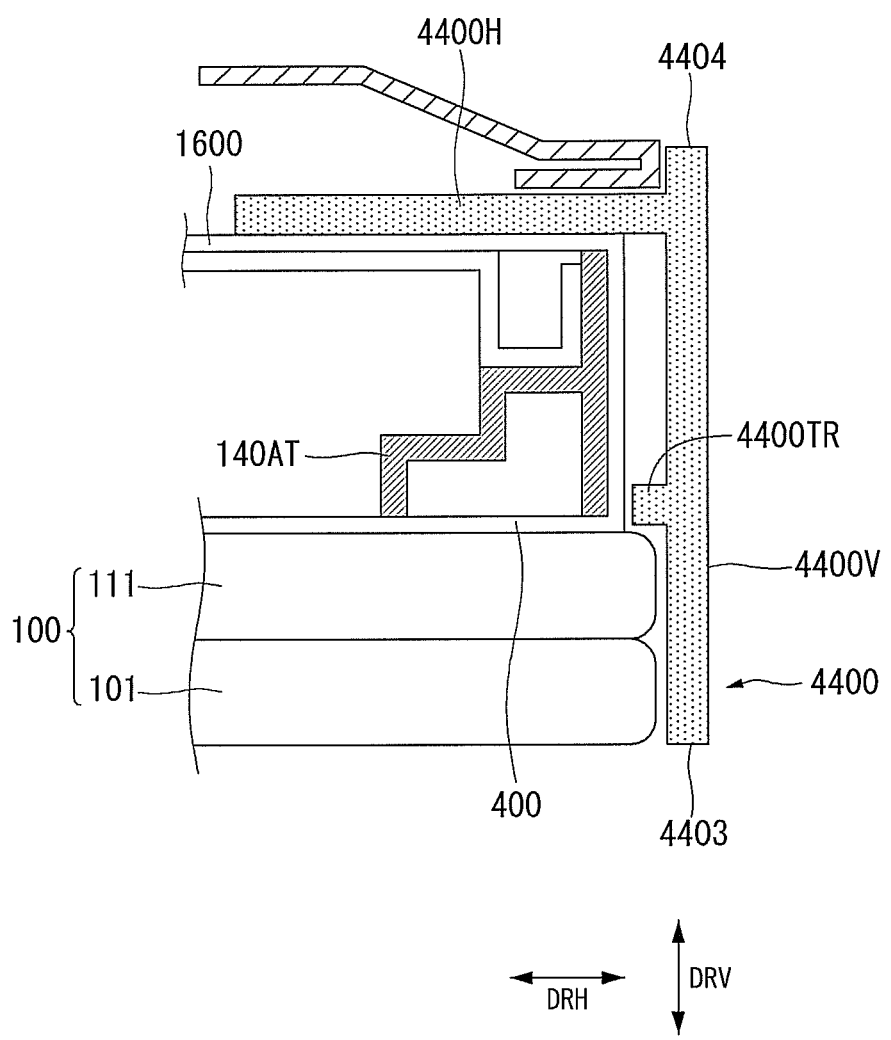
Figure 56:
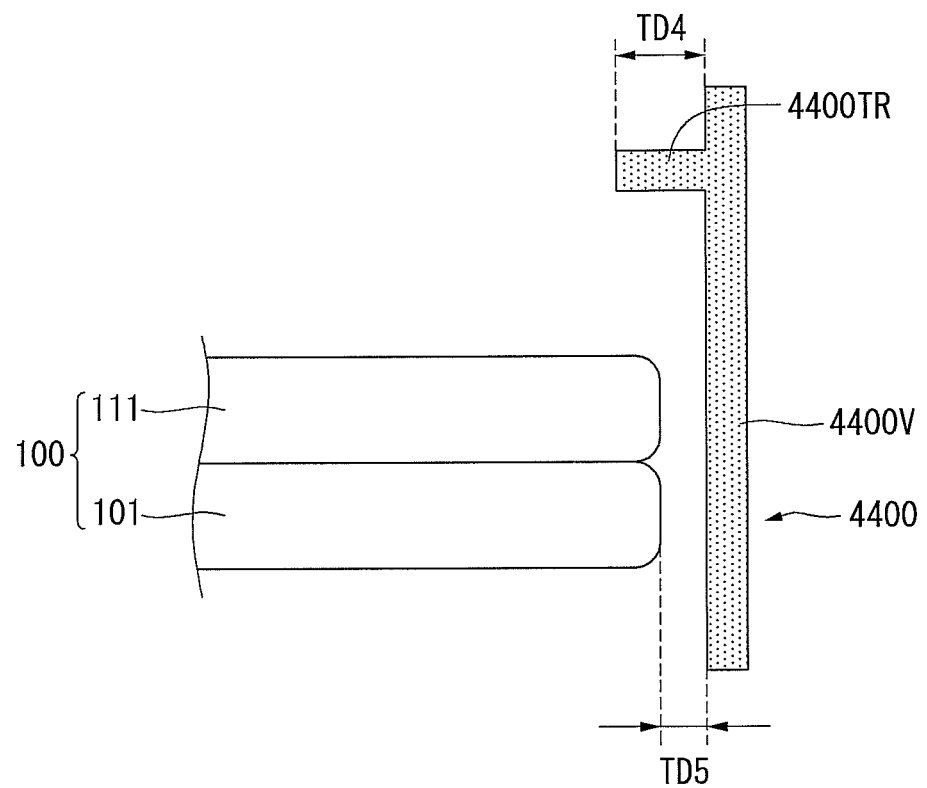

For example, as shown in FIG. 54, the vertical part 4400V of the side cover 4400 may include a portion having a gradually decreasing width as it goes to the rear of the display panel 100.

More specifically, in the vertical part 4400V of the side cover 4400, a width TS2 of a portion extending further than the front substrate 101 to the front of the front substrate 101 may be less than a width TS1 of a portion extending further than the back substrate 111 to the rear of the back substrate 111. In other words, in the vertical part 4400V of the side cover 4400, the width TS2 of the portion protruding further than the front substrate 101 to the front of the front substrate 101 by a predetermined distance TD1 may be less than the width TS1 of the portion protruding further than the back substrate 111 to the rear of the back substrate 111 by a predetermined distance TD3.

In this instance, a visual effect, in which the viewer in the front of the display panel 100 may feel that the size of the edge of the display panel 100 is less than the real size of the edge of the display panel 100, may be obtained. Further, the strength of the side cover 4400 may be further improved.

Figure 57:
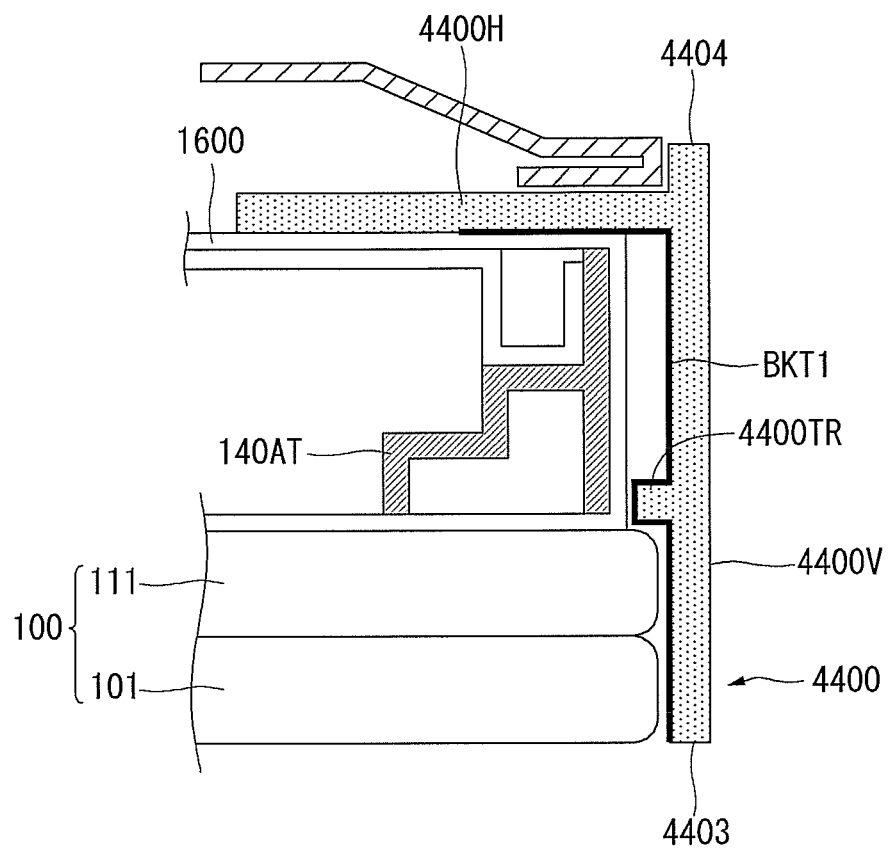

As shown in FIG. 57, a first black layer BKT1 may be formed on the inner surface of the side cover 4400. The first black layer BKT1 may be formed of a black tape or a black paint. In this instance, the first black layer BKT1 may further prevent light from leaking in the space between the display panel 100 and the side cover 400.

Figure 58:
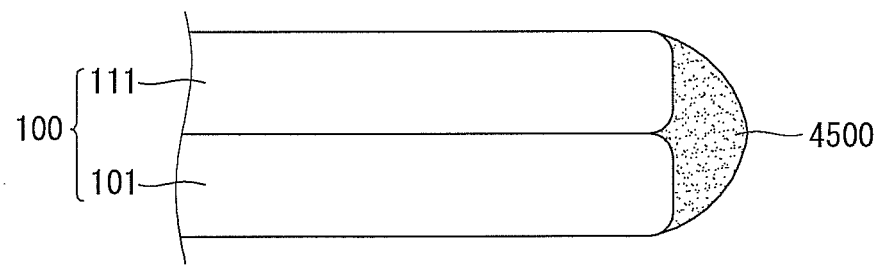

As shown in FIG. 58, a protective layer 4500 may be formed on the side of the display panel 100. The protective layer 4500 may protect the side of the front substrate 101 and the side of the back substrate 111 from an external pressure and an impact.

The protective layer 4500 may contain a substantially transparent material. Further, the protective layer 4500 may contain a photocurable material cured by light such as ultraviolet rays.

Figure 59:
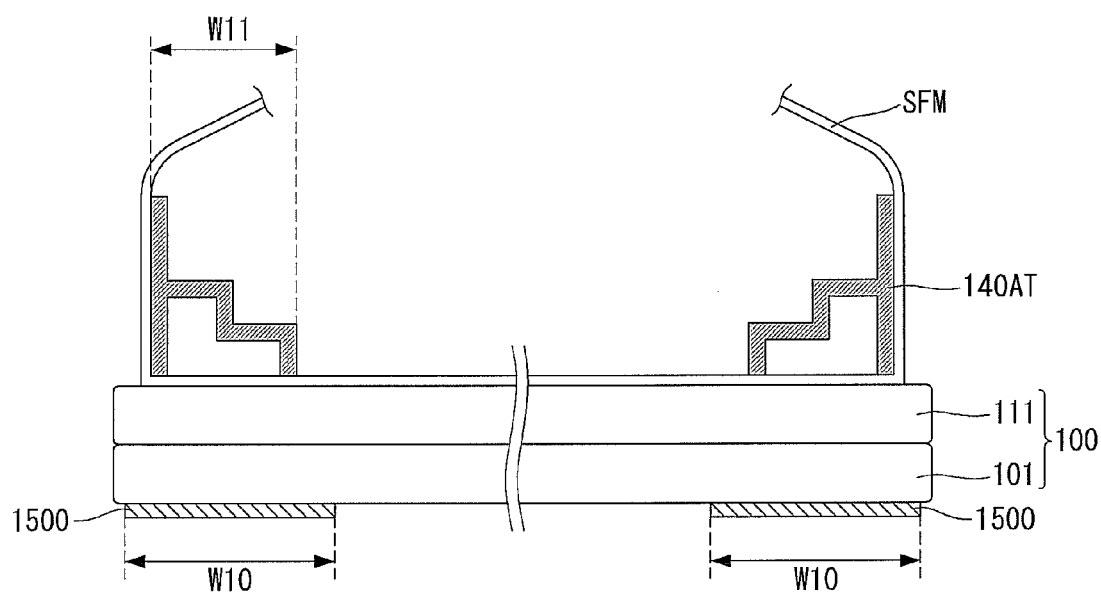

As shown in FIG. 59, a blocking member 1500 may be positioned at an edge of the front surface of the front substrate 101. Preferably, the blocking member 1500 may be attached to the edge of the front surface of the front substrate 101. Because the blocking member 1500 hides the dummy area of the display panel 100, the image displayed on a screen area (i.e., the active area) may be more prominently showed.

The blocking member 1500 may have lightness lower than ambient lightness. For example, the lightness of the blocking member 1500 may be lower than lightness of the display panel 100. For this, the blocking member 1500 may be substantially black. For example, the blocking member 1500 may be substantially a black tape and may be formed by attaching a black tape to the front surface of the front substrate 101. Thus, the blocking member 1500 may be referred to as a black layer.

Figure 60:
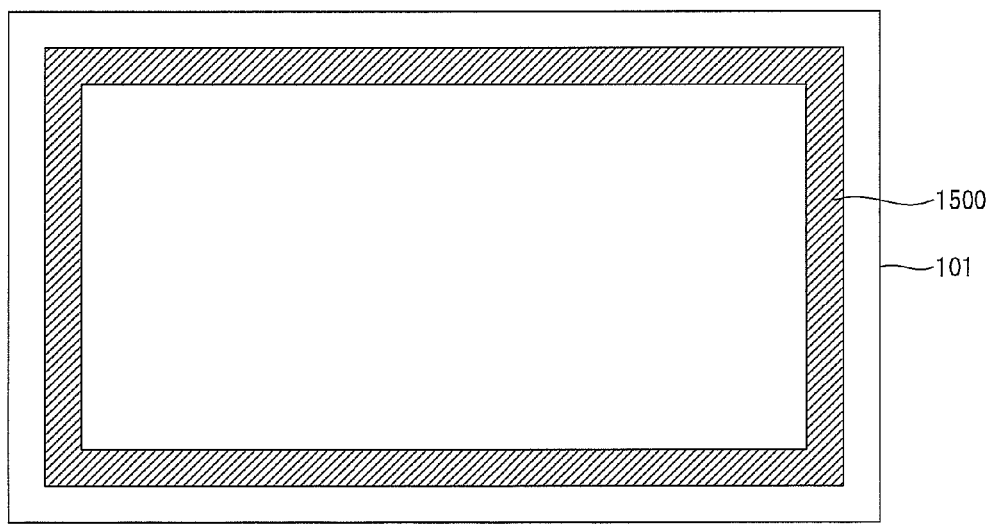

Because the blocking member 1500 is positioned on the front surface of the front substrate 101 and the edge of the front surface of the front substrate 101 is exposed, almost the entire portion of the blocking member 1500 may be exposed as shown in FIG. 60. In other words, when the observer in the front of the display panel 100 views the display panel 100, the observer may view almost the entire portion of the blocking member 1500. Namely, almost the entire portion of the blocking member 1500 may be observed.

Because the bracket 140AT does not display the image, it may be preferable that the bracket 140AT is positioned in the dummy area outside the screen area. Further, it may be preferable that the bracket 140AT is hidden by the blocking member 1500. Hence, as shown in FIG. 59, the blocking member 1500 may overlap the bracket 140AT. Preferably, the bracket 140AT may entirely overlap the blocking member 1500. More preferably, width W10 of the blocking member 1500 may be greater than width W11 of the bracket 140AT.

The width W10 of the blocking member 1500 and the width W11 of the bracket 140 are a width in a cross section of the display panel 100.

Figure 61:
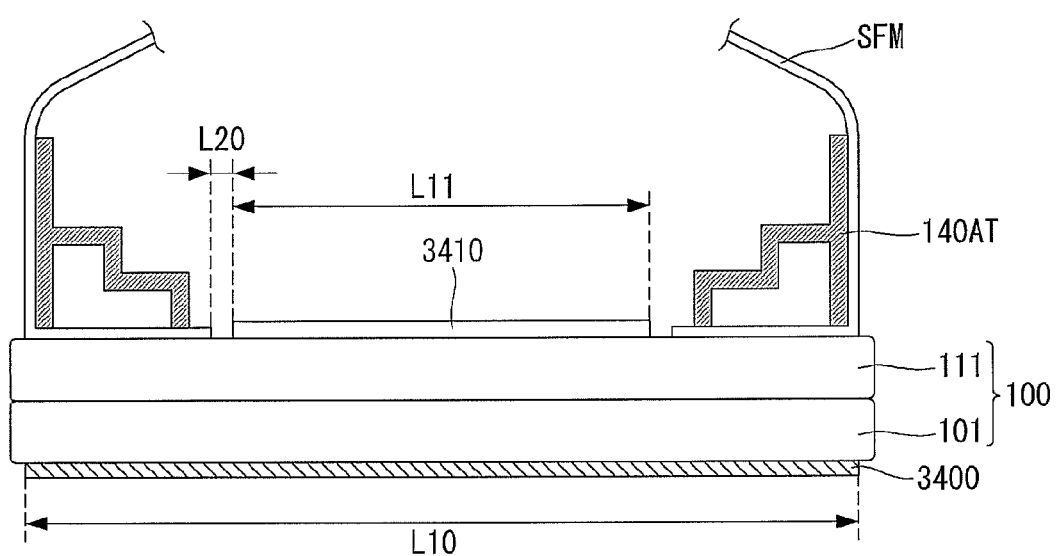
Figure 62:
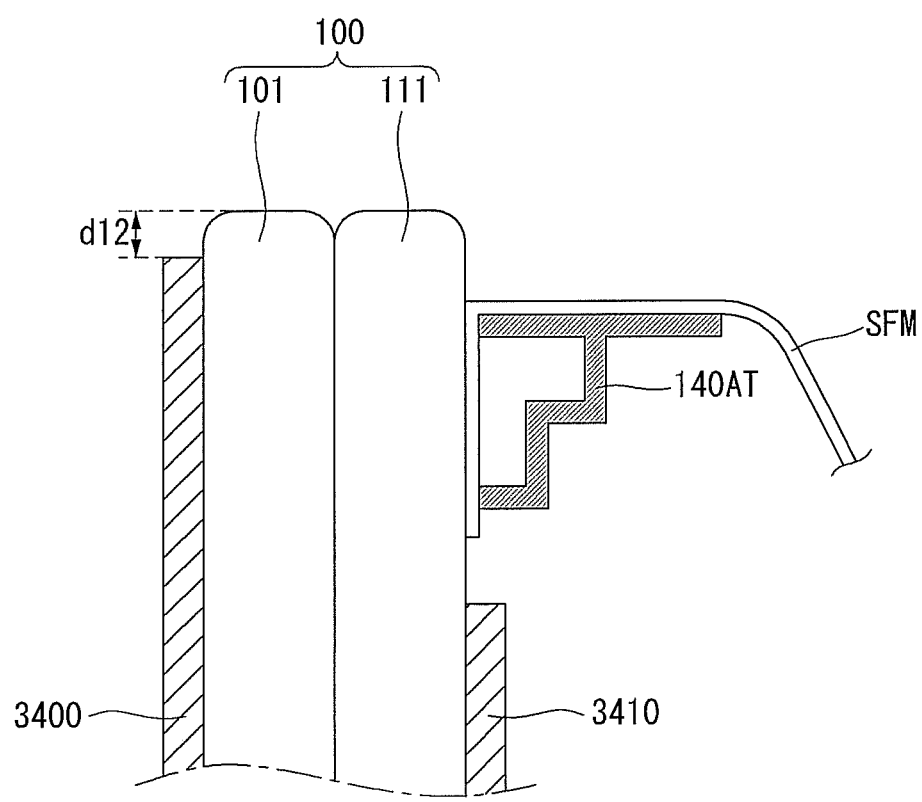

As shown in FIG. 61, the front polarizing film 3400 may be positioned on the front surface of the front substrate 101 of the display panel 100, and the back polarizing film 3410 may be positioned on the back surface of the back substrate 111.

A width L10 of the front polarizing film 3400 positioned on the front substrate 101 may be different from a width L11 of the back polarizing film 3410 positioned on the back substrate 111. The width L10 of the front polarizing film 3400 and the width L11 of the back polarizing film 3410 are a width in the cross section of the display panel 100.

Preferably, the width L10 of the front polarizing film 3400 may be greater than the width L11 of the back polarizing film 3410. In other words, an end of at least one side of the front polarizing film 3400 may extend further than the back polarizing film 3410.

More specifically, as shown in FIG. 61, the front polarizing film 3400 may include a portion overlapping the bracket 140AT. The bracket 140AT may be separated from the back polarizing film 3410 by a predetermined distance L20 in a direction parallel to the longitudinal direction of the back substrate 111.

Further, the front polarizing film 3400 may be separated from an end of the front surface of the front substrate 101 by a predetermined distance d12. In this instance, a process for attaching the front polarizing film 3400 to the front substrate 101 may be easily performed, and the production yield may be improved.

Figure 63:
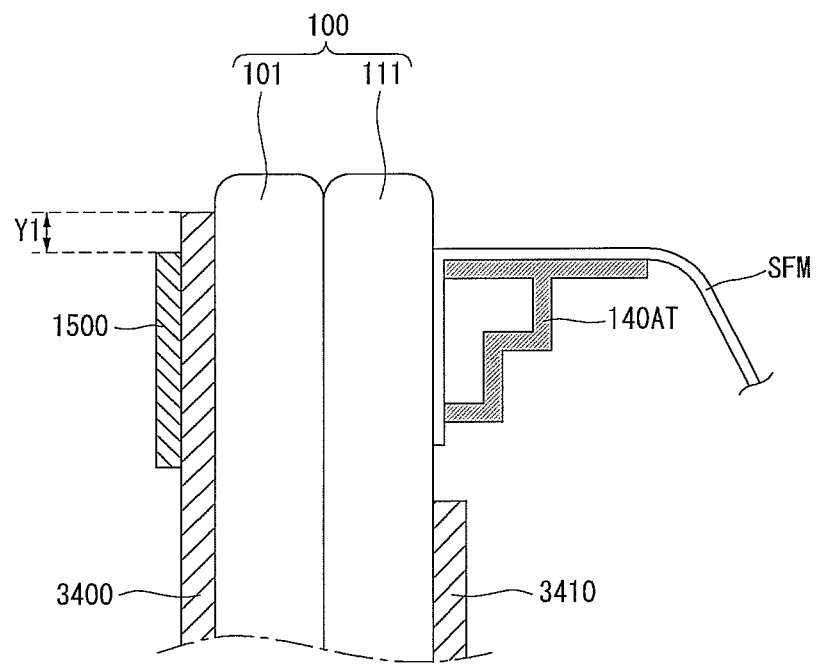

As shown in FIG. 63, the blocking member 1500 may overlap the front polarizing film 3400. For example, the blocking member 1500 may include a portion positioned on the front polarizing film 3400.

Further, the front polarizing film 3400 may include a portion Y1 extending further than the blocking member 1500 in a direction away from the middle of the display panel 100. FIG. 63 shows that the blocking member 1500 is positioned on the front polarizing film 3400. However, the blocking member 1500 may be positioned between the front polarizing film 3400 and the front substrate 101. Even in this case, the front polarizing film 3400 may include the portion Y1 extending further than the blocking member 1500 in the direction away from the middle of the display panel 100.

Figure 64:
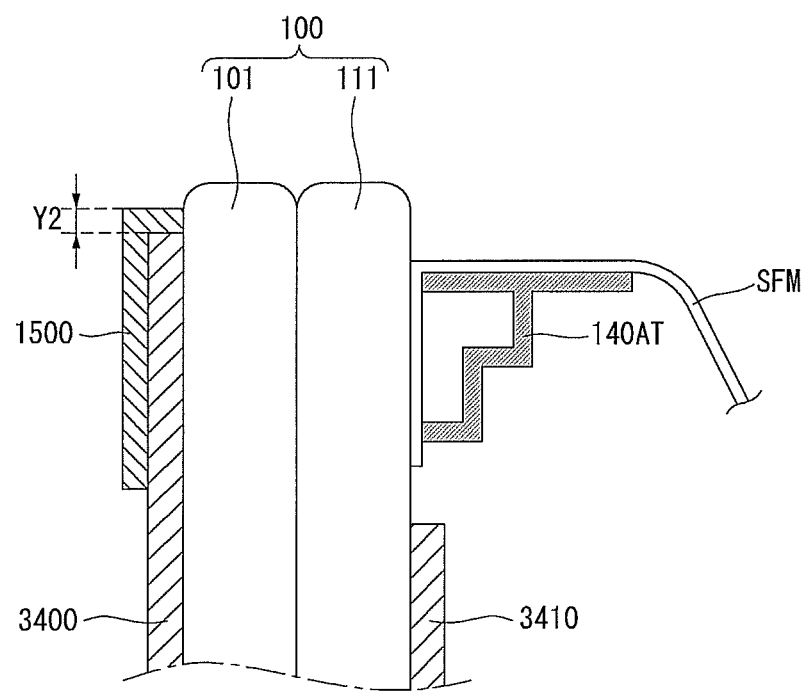

Alternatively, as shown in FIG. 64, the blocking member 1500 may include a portion Y2 extending further than the front polarizing film 3400 in the direction away from the middle of the display panel 100. In this case, the blocking member 1500 may contact both the front polarizing film 3400 and the front substrate 101.

FIG. 64 shows that the blocking member 1500 is positioned on the front polarizing film 3400. However, the blocking member 1500 may be positioned between the front polarizing film 3400 and the front substrate 101. Even in this case, the blocking member 1500 may include the portion Y2 extending further than the front polarizing film 3400 in the direction away from the middle of the display panel 100.

Figure 65:
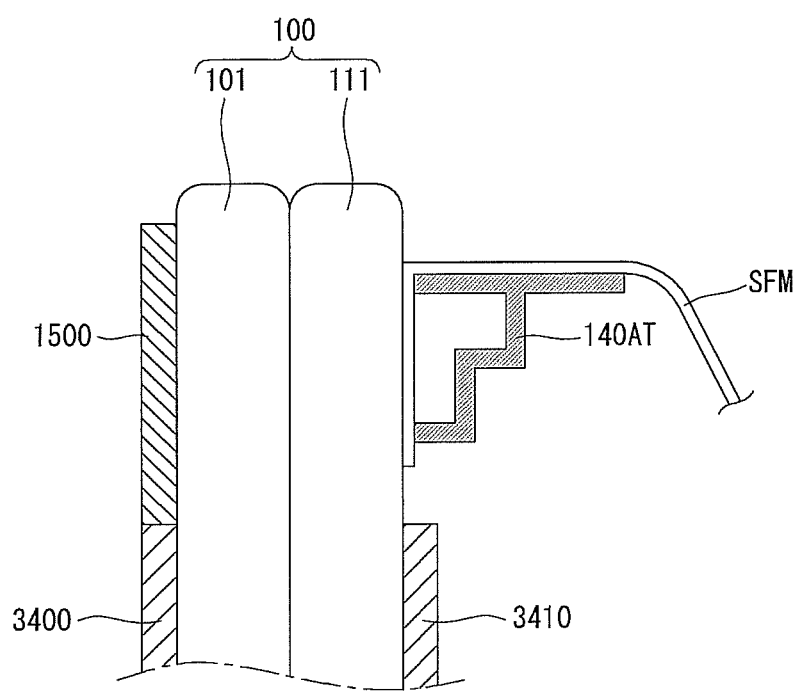

Alternatively, as shown in FIG. 65, the blocking member 1500 and the front polarizing film 3400 may be formed on the same layer level. In this instance, the blocking member 1500 may be positioned outside the front polarizing film 3400.

Figure 66:
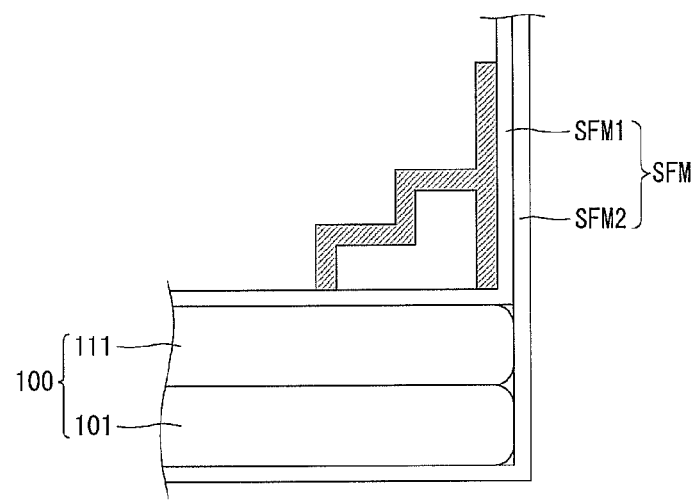

Referring to FIG. 66, the supporting film SFM may include a first supporting film SFM1 including a portion attached to the back substrate 111 and a second supporting film SFM2 including a portion attached to the front substrate 101. Also, the first supporting film SFM1 and the second supporting film SFM2 may be connected to each other. In this case, structures disposed in a space provided by the supporting film SFM can be supported more effectively. The first supporting film sFM1 may correspond to the back polarizing film, and the second supporting film SFM2 may correspond to the front polarizing film.

Referring to FIG. 67, the supporting film SFM may include a first supporting film SFM1 and a second supporting film SFM2, each including a portion attached to the back substrate 111. For example, the second supporting film SFM2 may include a portion attached to the dummy area DA of the back substrate 111, and the first supporting film SFM1 may include a portion attached to the second supporting film SFM2 and a portion attached to the active area AA of the back substrate 111. In this case, too, the strength of the supporting film SFM can be increased.

Moreover, the light transmittance of the first supporting film SFM1 may be preferably higher than the light transmittance of the second supporting film SFM2.

Further, the first supporting film SFM1 and the second supporting film SFM2 may be connected to each other.

Figure 68:
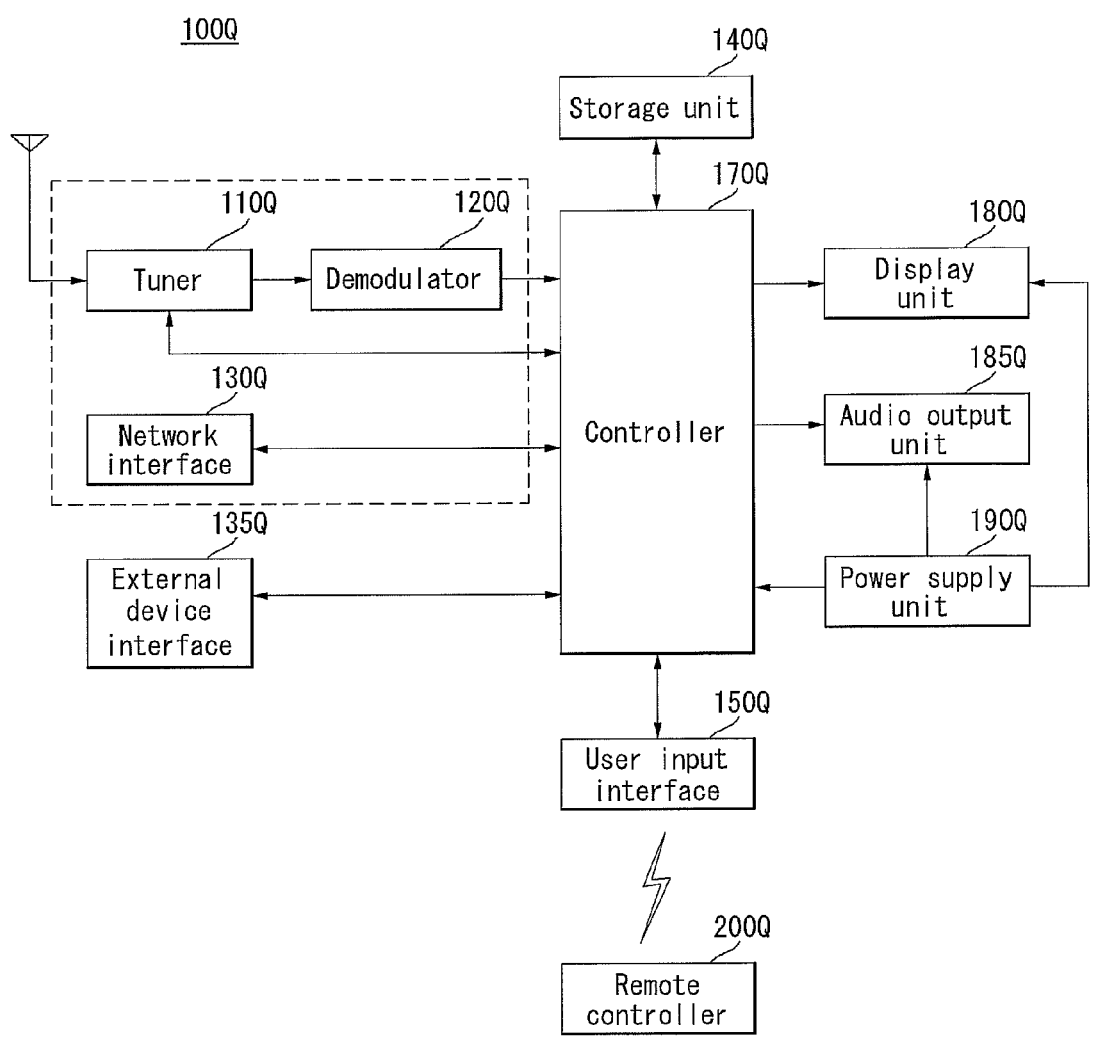
FIG. 68 illustrates another configuration of a display apparatus according to an example embodiment of the invention.

FIG. 68 illustrates another configuration of the display apparatus according to the example embodiment of the invention. In the following description, the descriptions of the configuration and the structure described above are omitted. Hereinafter, a broadcasting signal receiver is used as an electronic device, to which the display apparatus according to the embodiment of the invention is applied. The display apparatus according to the embodiment of the invention may be applied to other electronic devices such as cell phones.

A display unit 180Q shown in FIG. 68 may correspond to the display apparatus shown in FIGS. 1 to 67. Thus, the display apparatus according to the embodiment of the invention may be referred to as the display unit 180Q shown in FIG. 68.

As shown in FIG. 68, a broadcasting signal receiver 100Q according to the embodiment of the invention may include a broadcasting receiving unit 105Q, an external device interface 135Q, a storage unit 140Q, a user input interface 150Q, a controller 170Q, a display unit 180Q, an audio output unit 185Q, a power supply unit 190Q, and a photographing unit (not shown). The broadcasting receiving unit 105Q may include a tuner 110Q, a demodulator 120Q, and a network interface 130Q.

If necessary, the broadcasting signal receiver 100Q may be designed so that it includes the tuner 110Q and the demodulator 120Q and does not include the network interface 130Q. On the contrary, the broadcasting signal receiver 100Q may be designed so that it includes the network interface 130Q and does not include the tuner 110Q and the demodulator 120Q.

The tuner 110Q tunes a radio frequency (RF) broadcasting signal, which corresponds to a channel selected by the user or all of previously stored channels, among RF broadcasting signals received through an antenna. Further, the tuner 110Q converts the tuned RF broadcasting signal into a middle frequency signal, a base band image signal, or a voice signal.

The demodulator 120Q receives a digital IF signal converted by the tuner 110Q and performs a demodulating operation.

A stream signal output by the demodulator 120Q may be input to the controller 170Q. The controller 170Q performs demultiplexing, image/voice signal processing, etc. Then, the controller 170Q outputs an image to the display unit 180Q and outputs a voice to the audio output unit 185Q.

The external device interface 135Q may connect an external device to the broadcasting signal receiver 100Q. For this, the external device interface 135Q may include an audio-visual (AV) input/output unit (not shown) or a wireless communication unit (not shown).

The network interface 130Q provides an interface for connecting the broadcasting signal receiver 100Q to a wired/wireless network including an Internet network. The network interface 130Q may correspond to the wireless communication unit, which was described in detail above.

The storage unit 140Q may store a program for the signal processing of the controller 170Q and the control operation of the controller 170Q or may store the processed image signal, the processed voice signal, or a data signal.

The user input interface 150Q may transfer the signal the user inputs to the controller 170Q, or may transfer the signal from the controller 170Q to the user.

For example, the user input interface 150Q may receive and process the control signal indicating the turn-on or turn-off operation, the channel selection, the screen setting, etc. from a remote controller 200Q based on various communication manners such as a RF communication manner and an infrared communication manner. Alternatively, the user input interface 150Q may operate so that the control signal from the controller 170Q is transmitted to the remote controller 200Q.

For example, the user input interface 150Q may transfer a control signal, which is input from a power key, a channel key, a volume key, a local key, etc., to the controller 170Q.

The controller 170Q may perform the demultiplexing processing on the stream input through the tuner 110Q, the demodulator 120Q, or the external device interface 135Q or may perform the processing of demultiplexed signals, thereby generating or outputting the signals for outputting the image or the voice.

The image signal processed by the controller 170Q may be input to the display unit 180Q and may display an image corresponding to the image signal. Further, the image signal processed by the controller 170Q may be input to an external output device through the external device interface 135Q.

The voice signal processed by the controller 170Q may be output to the audio output unit 185Q. Further, the voice signal processed by the controller 170Q may be input to the external output device through the external device interface 135Q.

The controller 170Q may control the entire operation of the broadcasting signal receiver 100Q. For example, the controller 170Q may control the tuner 110Q, so that the tuner 110Q tunes a RF broadcasting signal corresponding to a channel selected by the user or a previously stored channel.

The controller 170Q may control the broadcasting signal receiver 100Q using a user command or an internal program input through the user input interface 150Q.

The display unit 180Q may convert the image signal, the data signal, and an OSD signal, which are processed by the controller 170Q, or the image signal and the data signal which are received from the external device interface 135Q, into red, green, and blue signals and may generate a driving signal.

The audio output unit 185Q may receive the voice signal (for example, stereo signal, 3.1 channel signal, or 5.1 channel signal) processed by the controller 170Q and may output the voice.

The power supply unit 190Q supplies the power required in all of the components of the broadcasting signal receiver 100Q.

The remote controller 200Q transmits the user command the user inputs to the user input interface 150Q. For this, the remote controller 200Q may use Bluetooth, RF communication, infrared communication, Ultra-wideband (UWB), Zigbee, etc.

The remote controller 200Q may receive the image, the voice, or the data signal output from the user input interface 150Q and may display the image, the voice, or the data signal or may output the voice or the vibration.

The broadcasting signal receiver 100Q may not include the tuner 110Q and the demodulator 120Q. Further, the broadcasting signal receiver 100Q may receive image contents through the network interface 130Q or the external device interface 135Q and may reproduce the image contents.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus comprising:
a display panel comprising a front substrate and a back substrate;
at least one structure disposed in the rear of the display panel;
a supporting film attached to the display panel and connected to the at least one structure, the at least one structure comprising at least one of a bracket, a frame disposed adjacent to the bracket or a film joining portion; and
an adhesive layer disposed between the supporting film and at least one of the bracket, the frame or the film joining portion;
wherein at least one portion of the supporting film contacts with at least one portion of the at least one of the bracket, the frame or the film joining portion.

2. The display apparatus of claim 1, wherein the supporting film comprises a light transmissive material.

3. The display apparatus of claim 1, wherein the supporting film surrounds at least one structure.

4. The display apparatus of claim 1, wherein the film joining portion is connected to both ends of the supporting film.

5. The display apparatus of claim 1, wherein the film joining portion is connected to the frame.

6. The display apparatus of claim 1, wherein the supporting film comprises:
a first supporting film corresponding to a display area for displaying an image of the display panel; and
a second supporting film corresponding to a dummy area positioned outside the display area of the display panel.

7. The display apparatus of claim 6, wherein the transmittance of the first supporting film is higher than the transmittance of the second supporting film.

8. The display apparatus of claim 1, further comprising:
a first film joining portion connected to one end of the supporting film; and
a second film joining portion connected to the other end of the supporting film.

9. The display apparatus of claim 1, wherein at least one structure is attached to the supporting film.

10. The display apparatus of claim 1, wherein the supporting film comprises a portion attached to the rear surface of the back substrate.

11. The display apparatus of claim 1, wherein the supporting film comprises a portion attached to the front surface of the front substrate.

12. The display apparatus of claim 4, wherein the film joining portion comprises a first film joining portion and a second film joining portion and the first and second film joining portions are connected to each end of the supporting film.

13. The display apparatus of claim 1, wherein the frame includes at least one protrusion and further comprising at least one optical sheet which includes at least one hole corresponding to the at least one protrusion.

14. The display apparatus of claim 1, further comprising:
a backlight unit disposed on an edge of the frame, the edge comprising at least one of each side or bottom of the frame.

15. The display apparatus of claim 1, further comprising:
a side cover including a sidewall disposed at a side of the display panel; and
a back cover located at a rear of the display panel,
wherein the side cover is connected to the frame and the back cover is connected to the side cover.

16. The display apparatus of claim 1, wherein the at least one bracket is provided adjacent to a side of the frame.

17. A display apparatus comprising:
a display panel comprising a front substrate and a back substrate;
at least one structure disposed in the rear of the display panel;
a supporting film attached to the display panel and connected to the at least one structure, the at least one structure comprising at least one of a bracket, a frame disposed adjacent to the bracket or a film joining portion;
an adhesive layer disposed between the support film and at least one of the bracket, the frame or the film joining portion;
a side cover including a sidewall disposed at a side of the display panel; and
a back cover located on a rear of the display panel,
wherein the side cover is connected to the frame and the back cover is connected to the side cover.

18. The display apparatus of claim 17, wherein at least one portion of the supporting film contacts with at least one portion of the at least one of the bracket, the frame or the film joining portion.

* * * * *